(12) United States Patent
Hegde et al.

(10) Patent No.: US 6,701,201 B2
(45) Date of Patent: Mar. 2, 2004

(54) DECOMPOSITION SYSTEM AND METHOD FOR SOLVING A LARGE-SCALE SEMICONDUCTOR PRODUCTION PLANNING PROBLEM

(75) Inventors: Sanjay R. Hegde, Essex Junction, VT (US); Robert J. Milne, Jericho, VT (US); Robert A. Orzell, Essex Junction, VT (US); Mahesh C. Pati, South Glastonbury, CT (US); Shivakumar P. Patil, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 09/934,662

(22) Filed: Aug. 22, 2001

(65) Prior Publication Data

US 2003/0065415 A1 Apr. 3, 2003

(51) Int. Cl.$^7$ .......................... G06F 17/60; G06F 19/00
(52) U.S. Cl. .......................... 700/107; 700/36; 700/97; 700/106; 705/8; 705/29
(58) Field of Search ............................. 700/29, 30, 32, 700/36, 97, 99–107; 703/6, 13, 17; 705/8, 9, 29

(56) References Cited

U.S. PATENT DOCUMENTS

| | | | |
|---|---|---|---|
| 5,235,508 A | 8/1993 | Lirov et al. | 700/99 |
| 5,548,518 A | 8/1996 | Dietrich et al. | 700/100 |
| 5,630,070 A | 5/1997 | Dietrich et al. | 705/8 |
| 5,787,000 A | 7/1998 | Lilly et al. | 700/95 |
| 5,796,614 A * | 8/1998 | Yamada | 700/106 |
| 5,943,484 A | 8/1999 | Milne et al. | 700/100 |
| 5,971,585 A | 10/1999 | Dangat et al. | 700/102 |
| 6,031,984 A | 2/2000 | Walser | 703/2 |
| 6,041,267 A | 3/2000 | Dangat et al. | 700/107 |
| 6,049,742 A | 4/2000 | Milne et al. | 700/99 |
| 6,088,626 A * | 7/2000 | Lilly et al. | 700/100 |
| 6,477,660 B1 * | 11/2002 | Sohner | 714/1 |
| 6,625,616 B1 * | 9/2003 | Dragon et al. | 707/104.1 |

OTHER PUBLICATIONS

W. Hopp, et al., "Factory Physics—Foundations of Manufacturing Management", IBM Microelectronics Technical Library, 1996, pp. 135–141.

Sullivan, G. and Fordyce, K.; "IBM Burlington's Logistics Management System"; 1990; Interfaces, 20, 1, 43–64.

Orlicky, J.; "Material Requirements Planning"; 1993; McGraw Hill.

Leachman, R. C., Benson, R. F., Liu, C., and Raar, D. J.; "IMPReSS: An automated production–planning and delivery–quotation system at Harris Corporation—Semiconductor sector";1996; Interfaces, 26, 1, 6–37.

Silver, S. A., Pyke, D. F., and Peterson, D. F.; "Inventory Management and Production Planning and Scheduling, 3rd Edition"; 1998; John Wiley and Sons, pp. 614–616.

(List continued on next page.)

Primary Examiner—Leo Picard
Assistant Examiner—Paul Rodriguez
(74) Attorney, Agent, or Firm—McGuireWoods LLP; Richard Kotulak

(57) ABSTRACT

A method and system for efficient allocation of limited manufacturing resources over time to meet customer demand. At the enterprise planning level this typically requires determination of a feasible production schedule for an extended supply chain. The method and system utilizes a new and unique type of systematic decomposition based on both product and process considerations. This approach simultaneously reduces the model size (and therefore computation time) and increases modeling flexibility from strictly linear programming based decision making to include more general nonlinear programming characteristics.

24 Claims, 13 Drawing Sheets

OTHER PUBLICATIONS

K. Fordyce et al.; "Supply Chain Management, Decision Technology, and e–Business Information Technology"; 1999; IBM MicroNews, vol. 5, No. 4.

Lyon, P., Milne, R. J., Orzell, R., Rich, R.; "Matching Assets with Demand in Supply–Chain Management at IBM Microelectronics"; 2001; Interfaces, 31, 1, 108–124.

Fordyce, K.; "New Supply Chain Management Applications Provide Better Customer Service: Serious Gets Exciting"; 2001; IBM MicroNews, 7, 2.

* cited by examiner

DECOMPOSITION SYSTEM AND METHOD FOR SOLVING A LARGE-SCALE SEMICONDUCTOR PRODUCTION PLANNING PROBLEM

BACKGROUND OF THE INVENTION

1. Field of the Invention

The present invention generally relates to a computer implemented decision support system for determining a production schedule of feasible material releases within a complex multi-stage manufacturing system architecture.

2. Background Description

A key requirement for successful operations management in any manufacturing industry is the coordination of both available and future supply with both existing and future demand. This process is referred to as supply-chain management. Large-scale manufacturing systems, such as those encountered in semiconductor manufacturing, involve complex distributed supply/demand networks. These large-scale manufacturing systems are linked with suppliers and distribution channels worldwide and have global manufacturing networks comprising, for example, a single site to dozens of sites. Analyzing and coordinating internal manufacturing logistics with external links to suppliers and distribution channels is critical to optimizing material flows, managing product mix profiles, and evaluating manufacturing system design changes.

Semiconductor manufacturing is a complex and refined process involving everything from growing silicon crystals, the source of silicon wafers upon which integrated circuits are grown, to the actual placement and soldering of chips to a printed circuit board. Initially, raw wafers are cut from a silicon ingot and processed through a sequence of work centers. The end goal of this process is to build a set of integrated circuits on the surface of the silicon wafer according to a specific circuit design. This process involves repeatedly applying four basic steps: (i) deposition, (ii) photolithography, (iii) etching and (iv) ion implantation. These steps are the processes by which materials with specific dielectric properties (e.g., conductors, insulators) are deposited on the surface of the wafer according to the precise circuit design specifications. These processes are repeated many times to build up several layers (typically between 12 and 25) of the circuits.

Once the circuits have been built on the wafers they are tested to determine the resultant yield of operational circuits and tagged for reference. Circuits are then diced and sorted, and subsequently wire bonded to a substrate to assemble a module. These modules, which are further tested to determine electromagnetic and thermal characteristics, are eventually combined on printed circuit boards to make cards. Finally, the cards are tested and those that pass are eventually used in the assembly of a wide range of finished electronic products (e.g., PCs, printers, CD players, etc.). From the point of view of semiconductor manufacturing, the modules and cards are the finished products taken to market.

There are many aspects of extended enterprise supply chain planning (EESCP) systems which affect the generation of production plans. For example, a large number of different parts are required to produce finished products such as modules and cards. From the above example, producing a module requires several subcomponent items including, but not limited to, a silicon wafer, a wire lead frame, substrate and the like. Furthermore, production of a module requires that several different types of resources be available (e.g., work centers, personnel and the like) for operations such as dice, pick and sort, testing, etc. For a particular manufacturing plant it is often (but not always) the case that there is only one way to produce a particular part number (PN). However, at the EESCP level it is common for there to be multiple sources from which to obtain necessary material supply as well as multiple options for resources to use for production. These options for supply and capacity resources to meet demand create complex tradeoffs involving decisions such as:

- which plant to source a particular part number (PN) from,
- which process in a given plant to use to make a PN,
- material substitutions, and
- whether to build inventory, and so on.

At a macro level, the problem involves optimally balancing material flows across a supply/demand network given finite available capacity, geographically differentiated supply and demand locations, material processing costs, inventory holding costs, parametric data (e.g., product yields, cycle times, etc.) and the like.

The complicated process architecture in the semiconductor manufacturing industry creates unavoidably long lead times for processing through all manufacturing stages to produce finished products. These production lead times necessitate the advance planning of production so that material releases throughout the production system are coordinated with the end customers' demand for any of a wide range of finished products (typically on the order of thousands in semiconductor manufacturing). Such advance planning depends on the availability of finite resources (finished goods inventory, work in process (WIP), workcenter capacity, etc.) and may tradeoff utilization of the resources at different locations, using different processes.

Planning and scheduling functions within the semiconductor manufacturing industry can be categorized in various ways. The following summary (Sullivan and Fordyce, "IBM Burlington Logistics Management Systems", Interfaces, 20, 1, 43–64, 1990), is based on a tier system in which each tier is defined by the time frame to which the decisions pertain.

Tier 1: Long range (3 months to 7 yr) strategic level decisions such as mergers, capacity acquisition, major process changes, new product development, and long term policy based decisions.

Tier 2: Medium range (1 week to 6 months) tactical scheduling involving yield and cycle time estimation, forecasting and demand management, material release planning and maintenance scheduling.

Tier 3: Short to medium range (weekly planning) operational scheduling for optimizing consumption and allocation of resources and output of product, demand prioritization techniques, capacity reservation and inventory replenishment.

Tier 4: Short range (daily) dispatch scheduling for addressing issues such as machine setups, lot expiration, prioritizing of late lots, job sequencing, absorbing unplanned maintenance requirements and assigning personnel to machines.

Due to the complicated process architecture and unavoidably long lead times to complete processing through all manufacturing stages for a finished product, advance planning decisions are a necessity. The above taxonomy of planning and scheduling decisions is hierarchical; that is, decisions in higher tiers affect decisions in the lower tiers. For example, long range capacity acquisition decisions determine eventual yield and cycle times, the available resources that can be utilized, and the extent to which maintenance needs to be scheduled in the future. Decisions in higher tiers, by the nature of their long time frames, are made under considerable uncertainty, and seek to anticipate future requirements based on current information. On the other hand, lower level tier decisions are of a corrective/reactive nature and act to absorb uncertainty not accounted for in the higher tiers. As an illustration, advanced production planning and scheduling decision support systems are typically run on a weekly basis, however, the planning horizon for such runs may range several years depending on the planning horizon of interest and the level of detail in forecasting. Thus, advance planning systems may impact decisions in tiers 1, 2 and 3 which, in turn, affect tier 4 decisions. Therefore, the matching of assets to demand at the EESCP level is a major planning activity which affects decisions within all tiers.

If unlimited assets were available, then the matching of demand with assets would be straightforward. In reality, however, finite supply and capacity create constraints on production scheduling. These constraints make the determination of a feasible production schedule (let alone an optimal one) a complex problem.

Major Production Planning Activities

The large-scale nature of production planning activities for EESCP as well as specialized processes specific to semiconductor manufacturing make production planning and scheduling a complex problem. The major activities in the production planning process are typically described in three categories: Supply Aggregation, Material Requirements Planning and Resource Allocation.

Supply Aggregation (SA):

SA involves capturing and transforming micro/factory floor details into a manageable data set. For example, work in progress (WIP) at a particular work center in the manufacturing system may ultimately travel through a variety of different routings depending on which type of finished product it is eventually used to produce. However, at any given point in the system a set of operations can be isolated which are common to all potential routing that the WIP can travel through from that point forward. In other words, a limited set of the immediate future operations required for the WIP are known. The purpose of the supply aggregation step is to project WIP forward through these required work centers to points at which decisions regarding alternative routings are necessary. As the WIP is moved forward its amount is adjusted for yield losses at the work centers it travels through. Furthermore, the time at which the WIP becomes available at the projected work center is computed based on known cycle times at each work center. Although these times should occur over a continuum, in practice they are discretized into a finite set of time periods. The end result of SA is to reduce the number of material release points considered to the level of resolution that is required for EESCP.

Material Requirements Planning (MRP)

MRP is a well known production scheduling method based on an explosion of finished product demand using manufacturing information such as the bill-of-material (BOM), yield and cycle times, inventory, and planned receipts. MRP is based on taking demand for finished product and sequentially computing the implied demand on the components used to manufacture the finished product. At each level of the BOM, required material releases are determined as well as the ideal release date based on cycle times at each work center.

For example, FIG. 1 shows a high level block diagram of the BOM for semiconductor manufacturing which can be broken into the following four aggregate stages: wafer stage 110, device/substrate stage 120, module stage 130, and card stage 140. These aggregate stages may involve many steps each of which may significantly impact the flow of materials through the manufacturing system. For example, the wafer stage 110 may involve wafer fabrication involving many passes through photolithography work centers to build multiple levels of a circuit structure. In the device substrate stage 120, the dicing of the silicon wafer involves a single item in the production process which is then converted into different devices. Also, the card stage 140 may involve the assembly of many devices to generate a single card. These stages result in multiple qualities of items being output from various stages of the manufacturing system according to a known distribution.

FIG. 2 demonstrates a simple BOM calculation for a rigid supply-chain with some additional complexity (as compared to FIG. 1). FIG. 2 further illustrates the effect of demand for some finished product "A" on the next level of MRP releases for components of "A". In FIG. 2, component "A" is assembled from subassemblies B1 and B2 in differing ratios, 1:2 and 1:1, respectively. Thus, demand for 100 units of component "A" induces requirements for a material release of 200 units of B1 and 100 units of B2. These MRP releases, in turn, induce requirements for MRP releases of components of B1 and B2 (i.e., C1, C2 and C3).

Another important feature of MRP is the determination of release dates (also referred to as time phasing). This is performed by using manufacturing cycle times for each level of the BOM to work backwards from the finished product delivery date. For example, in FIG. 2, if one week is required to assemble component "A", two weeks to assemble each of B1 and B2, and two weeks to build each of C1, C2 and C3, then releases for C1, C2 and C3 must be scheduled five weeks in advance of the delivery date for component "A". Together the material release sizes and timing comprise the production schedule.

Resource Allocation (RA)

RA systematically adjusts the ideal set of releases generated by the MRP to make them feasible with respect to constraints on limited resources. Resources allocated can be separated into two groups: supply and capacity. The fundamental difference between these two types of assets is that unutilized supply is available to apply at later time periods whereas unutilized capacity is not available at a later time period.

Historically a broad group of methodologies, referred to as extended MRP or MRP II, include steps in which capacity requirements are evaluated based on releases generated by MRP. A method referred to as "Heuristic Best Can Do" (See, for example, U.S. Pat. No. 5,971,585) extends the capability of MRP II based systems from analysis to the actual development of a feasible near optimal production schedule. By example, when supply and/or capacity constraints are violated by the MRP releases, the schedule of releases is adjusted in time by moving a portion of the release to a sufficiently earlier period in time (if possible and later if necessary) such that the required supply and capacity are available. This involves moving up from lower to higher levels of the BOM (implosion) and allocating resources sequentially at each level based on a priority ranking of the MRP material releases which is performed through pegging in which priority ranking information is passed between levels of the BOM. That is, pegging refers to the passing and storing of information about the different demand implied on components from one level of the BOM to the next level of the BOM.

FIG. 3 shows an example of pegging with two finished products and three components for a two-level BOM. In FIG. 3, finished products "A" and "B" share component 2. Thus, implied demand for component 2 is subcategorized into demand of type "A" and type "B".

Another option, instead of the use of a heuristic, is linear programming (LP) based technology. Such an approach is based on a mathematical formulation/definition of a problem and systematic determination of an optimal solution to the problem. (See, for example, U.S. Pat. No. 5,971,585). The LP based approach is often superior to heuristic based approaches, however, the LP approaches may involve significantly greater computation time and, in fact, problems may, in some cases, be effectively unsolvable.

Specialized process dependent factors in semiconductor manufacturing introduce additional complexities beyond those that can be readily handled by basic MRP. For example, at certain stages of the manufacturing process there is the opportunity for material substitution in which higher quality items are substituted for lower quality items. This opportunity presents itself due to a process known as binning whereby a distribution of product qualities (e.g., 1100 MHZ, 900 MHZ, 700 MHZ processors) is created for circuits built on a silicon wafer. Material substitution and binning are sources of additional complexity in semiconductor manufacturing that must be accounted for in computing an adequate production schedule.

In some simple cases the effect of binning is to link decisions about material releases between only two levels within the BOM. In more complex cases, substitution opportunities may result in decisions being made at a particular level of the BOM which potentially affect supply chain logistics at far removed parts of the BOM. Similar complex substitution decisions are necessary when there are multiple processes and plant locations by which a particular PN can be produced. In this case, decisions must be made about where to serve supply from rather than whether to substitute existing supply. When substitution decision affects are localized, heuristics provide adequate solutions; however, LP models are a better approach when the choice of an assembly to use to cover demand upstream in a supply chain affects the flow of material for all subassemblies, components, etc. throughout the supply chain.

FIG. 4 shows specialized processes in semiconductor manufacturing with a high level example of the module, device and wafer stages in semiconductor manufacturing. First, wafer "W" yields a distribution of devices A1, B1, C1 in the proportions of 50%, 20% and 30%, respectively, in level 2. In the example, wafer "W" yields 100 chips, thus, the yield is 50 of A1, 20 of B1, and 30 of C1. Next, within the device stage of level 3 there are device dependent yield losses. For example, from A1 to A2 there is a 10% loss (i.e. 90% yield). Finally, devices are incorporated into modules in level 4, a process in which there is the opportunity to substitute higher quality (faster) devices for lower quality (slower) devices. For example, in FIG. 4, the prime module in level 4 can substitute for either the fast module or slow module. Similarly, the fast module can substitute for the slow module (but not vice versa). These additional features of semiconductor manufacturing are important considerations in determining material releases.

Data/Modeling Requirements

There are several key pieces of data that are required for EESCP. One key source of data is the Bill of Material (BOM). The BOM is the source of data that specifies components used in the assembly of each particular PN produced within the manufacturing system. The BOM can be used to generate a graphical representation of the stages within a manufacturing process for each of the produced finished products. The BOM also plays an important role in defining the structure of the supply-chain. For example, in FIG. 1, the aggregate stages involve many steps each of which can significantly impact the flow of materials through the manufacturing system. Illustrative of this point is the wafer stage which involves wafer fabrication involving many passes through photolithography work centers to build multiple levels of circuit structure. Dicing of the silicon wafer involves a single item in the production process (wafer) being converted into many items (devices). Alternatively, the card stage may involve the assembly of many items (devices) to generate a single item (card).

Another aspect specific to semiconductor manufacturing is the fact that the quality of manufactured items varies as a natural result of the manufacturing process. This results in multiple qualities of items being output from various stages of the manufacturing system according to a known distribution. In addition to the information associated with the BOM, other sources of manufacturing information such as yields, cycle times, shipping routes, etc. are also important for EESCP. Other typical key sources of information may include:

various build options by process and plant location,
a yield and cycle time for PNs by process and plant location,
capacity availability by process and plant location,
capacity requirement rates for PNs by process and plant location,
inventory holding costs, processing costs, and backorder costs,
demand statement, and
binning distributions.

Many publications outlining MRP methodology have been published (see for example, "Material Requirements Planning", by Joseph Orlicky, published by McGraw Hill, 1993). Plans generated using MRP are often referred to as ideal plans since they are uncapacitated and can be temporarily infeasible (they assume unlimited supply and capacity). RA is concerned with the allocation of limited capacity and materials to generate a feasible production schedule. Various rough-cut capacity planning methods have been documented in the literature (see, for example, Silver and Peterson, 1998, "Inventory Management and Production Planning and Scheduling", $3^{rd}$ edition, John Wiley and Sons). However, detailed capacitated material release scheduling has been much less explored. One such method is described in U.S. Pat. No. 5,971,585, assigned to the common assignee (International Business Machines, Corp.).

Furthermore, many other patents and known literature consider either LP based models or heuristics, alone. None of these models combine LP and heuristics models. Production planning problems in general can benefit from the use of either LP or heuristic based modeling approaches. There is a basic tradeoff, however, between the two different approaches. The heuristic approach has the advantage of being computationally fast and is capable of handling some of the specialized processes in semiconductor manufacturing. On the other hand, in some cases decisions about matching supply with demand at a particular part of the supply chain can significantly affect material flows in far removed parts of the supply chain. In such cases an LP model is best suited for the semiconductor manufacturing processes.

U.S. Pat. No. 5,943,484 includes the concept of automatically assigning part numbers to LP or Heuristic processing depending upon the complexity and connections of the part to other parts through the bills of material supply chain. However, U.S. Pat. No. 5,943,484 addresses the problem only in the context of an (advanced) MRP and also does not partition into distinct manufacturing stages.

Leachman et al., "IMPReSS: An automated production-planning and delivery quotation system at Harris Corporation-Semiconductor sector", Interfaces, 26, 1, pages 6–37, 1996, uses a decomposition approach to solve a large-scale semiconductor production planning problem. The Leachman et al. approach assumes a fixed or rigid bill of material structure; however, general process architectures (such as in the IBM Microelectonics semiconductor manufacturing process architecture) do not fit such specific BOM structure assumptions and therefore the Leachman et al. approach cannot be used as a production planning tool in such systems. By way of example, the Leachman et al. solution does not properly handle the double-speed sorting process, or any situations where the solution at one set of BOM levels depends upon the supply chain characteristics at other sets of BOM levels.

FIG. 5 provides an example of double speed sorting. In this example, wafers are processed in the level 1 and level 2 (front end and back end, respectively) of the line operations to produces devices (circuits that reside on a wafer) in level 3. The wafers are subsequently diced, and individual devices are tested. Such testing reveals, in level 4, that some devices have fast speeds, while others have medium and slow speeds. These three categories of devices are used to produce three types of modules in level 5 (Modules 1, 2 and 3). These modules are then speed-tested and sorted a second time into groups A, B and C in level 6. In level 7, the module groups A, B and C are applied to demand for finished modules X, Y and Z according to substitution rules.

An important function of any EESCP system is to align the matching of supply with demand attributes. A common approach is to assign each order a customer demand class priority which ranks the importance of allocating supply to such orders. In order to be consistent in this regard, it is necessary to pass this information back through the BOM when determining the implied (dependent) requirements for subassemblies, components, etc. due to finished product demand resulting from the order. This allows comparison of the importance of committing material supply and/or capacity relative to other orders requiring the same resources. The Leachman et al. solution, however, does not appear to pass demand attributes such as customer class from the top to the bottom of the BOM and thus cannot provide proper demand prioritization at the lower level partitions.

Also, with regard to the specific motivation and exploitation of the decomposition scheme, the Leachman et al. model only applies LP or Heuristics, but not both, at a given level of the bills of material. As such, this model does not capture the complexity associated with mixing multiple model types, such as the need for capacity partitioning. Furthermore, the Leachman et al. model does not take advantage of decomposition to introduce nonlinear modeling functions. Finally, the Leachman et al. solution does not partition capacity.

SUMMARY OF THE INVENTION

In one aspect of the present invention, a method is provided for computing a production plan for part numbers (PNs) throughout a bill of material supply chain. The method includes the steps of separating the bill of materials (BOM) into separate manufacturing stages and partitioning each manufacturing stage into a heuristic processing and a linear programming processing partition. PNs are then assigned to partitions based on manufacturing steps and solution methods (i.e., heuristics or linear programming). A Material Requirements Planning (MRP) production plan is calculated for the each manufacturing stage using either the heuristic processing or the linear programming processing by moving backwards through the stages with respect to the BOM. A best-can-do production plan is calculated using either the heuristic processing or the linear programming processing, depending on the partitioning step by moving forward through the stages with respect to the BOM. The MRP production solution information is prepared for passing recursively backward to a next manufacturing stage. Similarly, information is passed forward based on the best-can-do calculating step.

In embodiments, the partitioning of the each manufacturing stage is defined by a specific manufacturing stage with respect to the BOM. Also, a part associated with the PNs requires linear programming processing due to the part's inherent complexity or a user specified demand. The method also includes imploding and exploding (from top to bottom) the BOM, as well as pegging. The MPR-type linear programming processing may run with a time horizon that begins in the past and further provides, preferably, feasible solutions. The method may further included mapping functions for demand attribute information against needs based on fields determined by the linear programming processing and determining which of the needs support which demand attribute information. The needs may further be mapped against assets supplying the needs or against end-item demands they are supporting.

In another aspect of the present invention a system is provided for computing a production plan for part numbers (PNs) throughout a bill of material supply chain. A machine readable medium containing code for computing a production plan for part numbers (PNs) throughout a bill of material supply chain is also provided which implements the steps of the present invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention generally relates to computer implementable decision support systems for determining a production schedule of feasible material releases within a complex multi-stage manufacturing system architecture. More specifically, the present invention is directed to a system and method for modeling of extended enterprise supply chain planning (EESCP) systems. The present invention decomposes a large-scale RA problem to reduce computation time, allow for mixing of modeling methodologies (including LP and heuristic methods) and the application of nonlinear business rules. The approach uses optimization based modeling for a large-scale EESCP problem which involves generating a centralized enterprise-wide plan which optimizes the use of MD (Microelectronics Division) enterprise resources (supply and capacity) to best satisfy a demand statement which includes current demand and future demand forecasts. This approach allows for a general model capable of conforming to multiple process architectures at different plants within the enterprise. The present invention simultaneously addresses both the scale and the complexity in a single embodiment to produce high quality production plans with reasonable computation times.

The basic approach of the present invention is to decompose the large-scale problem based on user defined manufacturing stages as well as partitioning PNs within each stage based on whether they are planned via LP models or heuristics. Commercially available LP solvers may be used with the present invention. The stages form the basis upon which the EESCP problem is decomposed because each different stage is solved separately. Each stage that is solved passes information backward or forward (depending on whether the pass is an explosion or implosion) as input into the next stage problem. Stages are chosen based on the BOM structure in such a way that portions of the BOM in a given stage is nearly independent of the BOM in other stages. Another aspect of how decomposition is carried out by the present invention is PN partitioning. In this feature of the invention PNs within a given manufacturing stage are partitioned into (a) PNs that are modeled using the heuristic and (b) PNs that are modeled using the LP.

Figure 6:
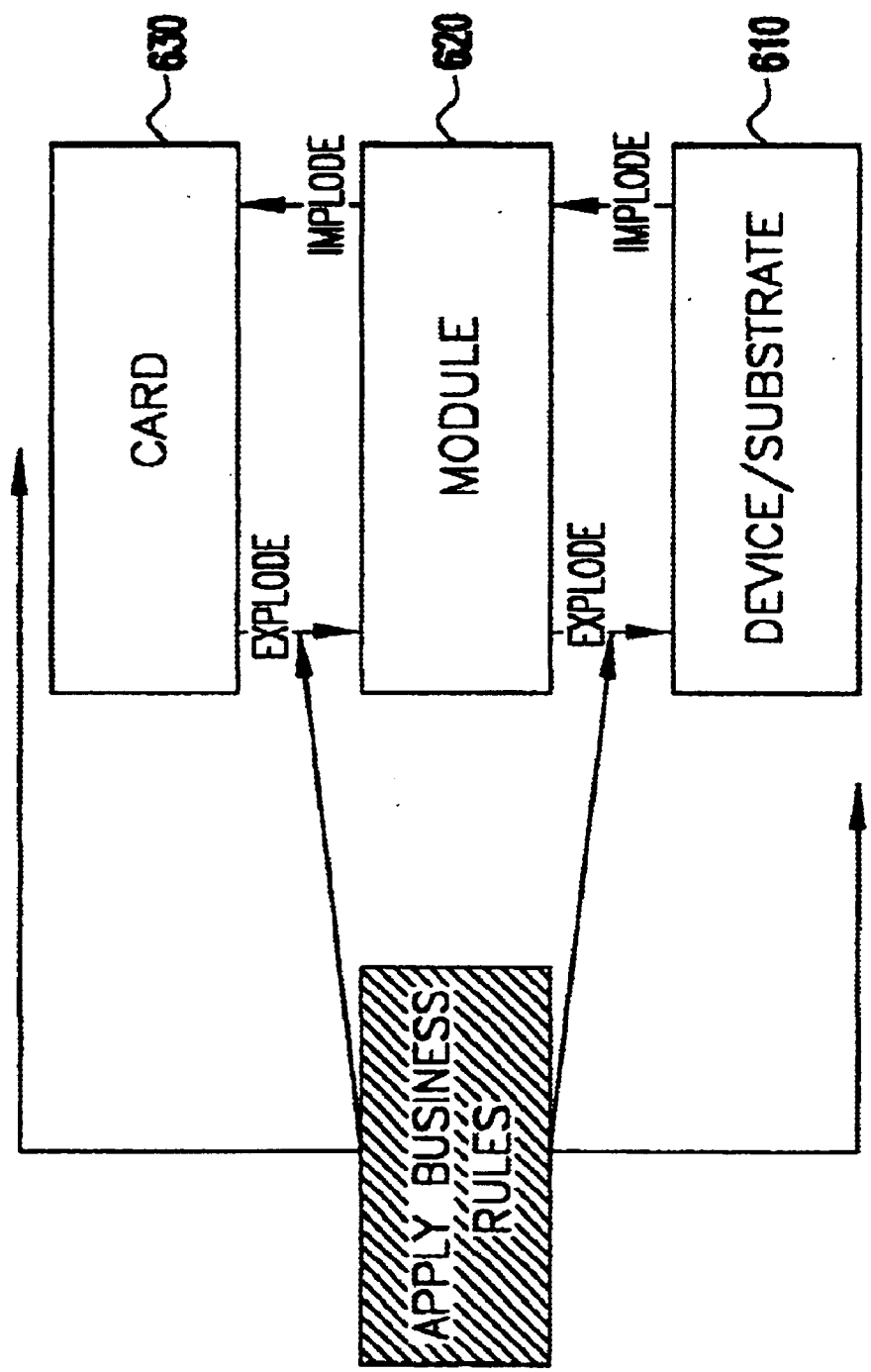
FIG. 6 shows an example of partitioning of various levels of the BOM to apply nonlinear business rules.

Now referring to the drawings, FIG. 6 shows the concept of staging which is implemented by the present embodiment. The basic stages are Device/Substrate stage 610, Module stage 620 and Card stage 630. At a high level, the approach of the present embodiment starts at the end product (Card) stage 630 and moves backwards (explosion) through the stages 620 and 610 to compute dependent demands using MRP. The second pass begins at the Device/Substrate stage 610 and moves forward (implosion) through stages 620 and 630, modifying MRP generated material releases to be supply and capacity feasible. Within stages some of the material releases are planned using LP based technology and some are planned using a heuristic. After computation at a given stage and prior to beginning computations for the following stage in the implosion pass there is the opportunity to modify the production plan before it is passed between stages. Note that the three stage flow illustrated in FIG. 6 is one example and may be extended to a greater or fewer number of stages.

Figure 7:
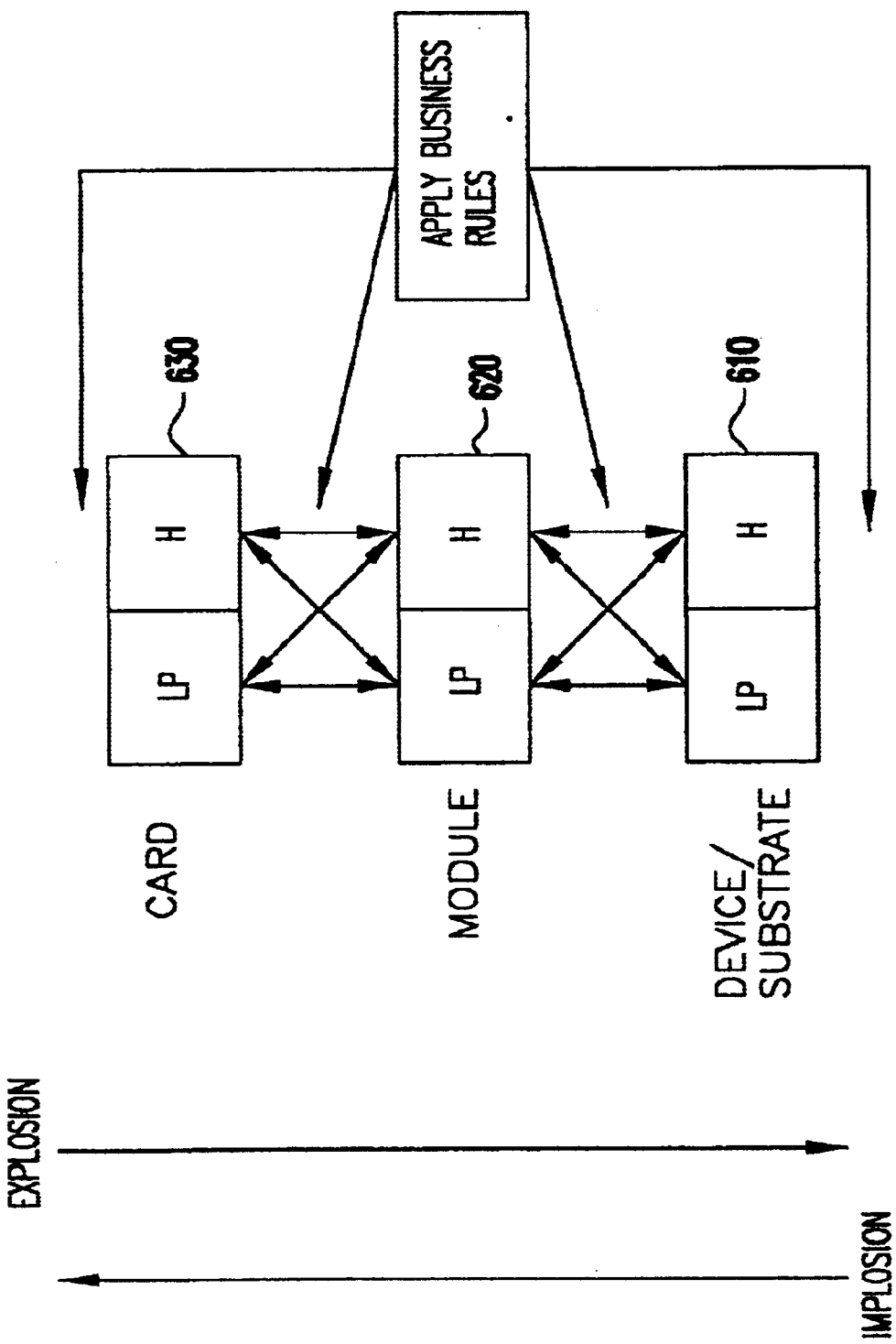
FIG. 7 shows an example of partitioning of parts and at various levels of the BOM to apply business rules.

FIG. 7 shows the splitting or partitioning of parts at various levels of the BOM. Specifically, FIG. 7 shows the Card, Module, and Device/Substrate stages 610, 620 and 630, respectively, as well as the partitioning of these stages into Heuristic (H) and LP models. The arrows between the stages 610, 620 and 630 indicate that information is passed between both model types (H and LP) on both the backward and forward passes between the stages. In other words, some portions of the BOM for a given finished product may be planned with LP while other parts are planned with heuristics.

Figure 8:
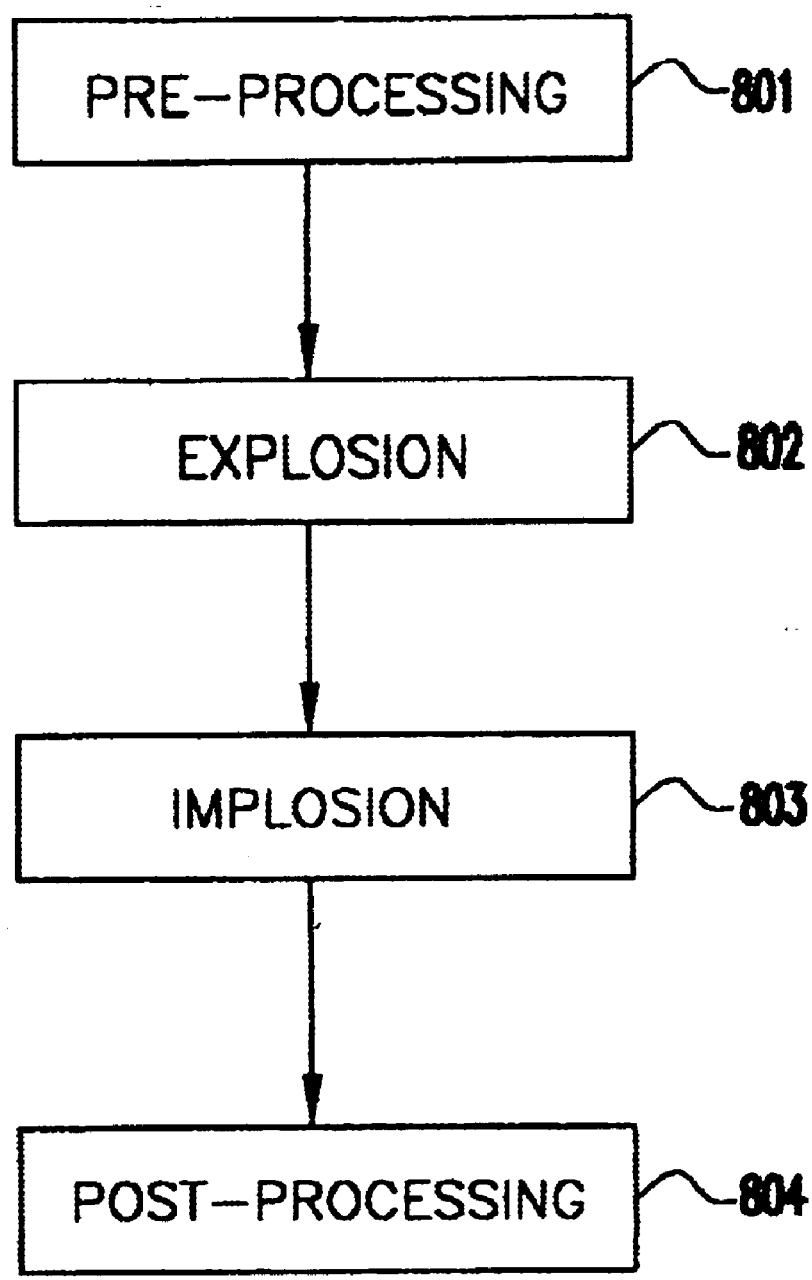
FIG. 8 shows a flowchart implementing the steps of the present invention.

FIG. 8 shows a flow chart implementing the steps of the present invention. FIG. 8 (as well as FIGS. 9–11 and 13) may equally represent a high level block diagram of the system of the present invention. The steps of FIG. 8 (as well as FIGS. 9–11 and 13) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. In one embodiment, the steps of the present invention may be implemented on a IBM SP2 machine with AFS (Andrew File System) for data storage. The SP2 is a collection of IBM RISC 6000 systems running under a common AIX operating system. While the present invention is independent of the computer/system architecture, one advantages is the use of multiple solution methods by decomposing the problem into independent subproblems. Furthermore, the decomposition based approach is suitable for parallel programming to reduce computation time.

Now referring to FIG. 8, the steps of the present invention include Preprocessing (function block 801), Explosion (function block 802), Implosion (function block 803), and Post-processing (function block 804). More specifically, preprocessing is performed in function block 801. The preprocessing step of function block 801 includes strategically separating the BOM into stages such that the stages are substantially independent of one another. Thereafter, PNs are assigned to the partitions, where a partition is defined by (i) a specific manufacturing stage with respect to the BOM and (ii) the solution methodology, either based on linear programming or heuristic. The assignment may proceed based on encoded/automated rules and/or user specified PN lists. Further preprocessing steps may include, for example, copying complex PN data from lower stages (relevant to their position in the BOM) to higher stages based on model complexity.

In function block 802, an MRP-type explosion is carried out to determine certain requirements. For parts in the current-stage-LP-model partition (where the current stage is assumed to have been initialized to the first stage), a backward MRP-type LP calculation is provided. For parts in the current-stage-Heuristic-model partition, a Heuristic-type MRP calculation is provided. If the current stage is not the last stage then the present invention will increment the current stage and prepare solution information to be passed back to the next stage by applying pegging and other data processing, and return to the beginning of function block 802 to execute the MPR-type explosion for the next stage.

In function block 803, capacitated implosion is carried out in which supply is matched to the requirements (computed in function block 802) subject to capacity constraints. The explosion and implosion steps involve passing information backwards (explosion) and forwards (implosion). Nonlinear business rules are applied during the passing of information between stages of the implosion. In function block 803, the present invention systematically allocates capacity among the LP model and Heuristic model for the current stage. For parts in the current-stage-LP-model partition, a forward capacitated LP-type calculation is provided. For parts in the current-stage-Heuristic-model partition, a forward capacitated Heuristic-type calculation is provided. If the current stage is not the first stage then the present invention decrements the current stage and prepares solution information to be passed forward to the next stage by applying pegging, nonlinear business rules, and data preprocessing, and returns to the beginning of function block 803.

Finally, in function block 804, once the feasible production plan has been generated, post-processing is carried out to create coherent output files and user-friendly reports. That is, in function block 804, the output of the various partitions may be consolidated and formatted to present a single coherent view of the solution for the user. This includes consistent output files and reports.

As thus described, the present invention, using the steps of FIG. 8, is capable of solving the EESCP problem by strategically decomposing the complete problem into sub-problems (less computationally intensive problems) based upon groupings of BOM levels and also product complexity. The sub-problems may be solved as independently as possible (e.g. capacity is generally not shared across the different groupings of BOM levels). Fast heuristics are used to plan products of moderate complexity whereas the more accurate but slower running Linear Programming (LP) technology is used to plan the most complex products. The solutions to these sub-problems are then woven together so that the overall large-scale problem is solved.

The Preprocessing Step

The function block 801 of FIG. 8 refers to the preprocessing which occurs prior to the invocation of most of the core explosion and implosion calculations. One aspect of preprocessing is the assignment of PNs to partitions. By way of example, in FIG. 7 a situation containing six partitions is shown: Card-LP, Card-H, Module-LP, Module-H, Device-LP, and Device-H. The manufacturing stage of a PN would determine whether the PN is placed into a Card, Module, or Device partition. This manufacturing stage, by PN, may be determinable from user supplied input file(s). The PN is placed into a Linear Programming (LP) or Heuristic (H) partition based on its complexity and the complexity of parts it is connected to in the BOM. So, for example, a PN in the Card manufacturing stage which is complex enough to require Linear Programming (LP) processing may be placed into the Card-LP partition.

Figure 9:
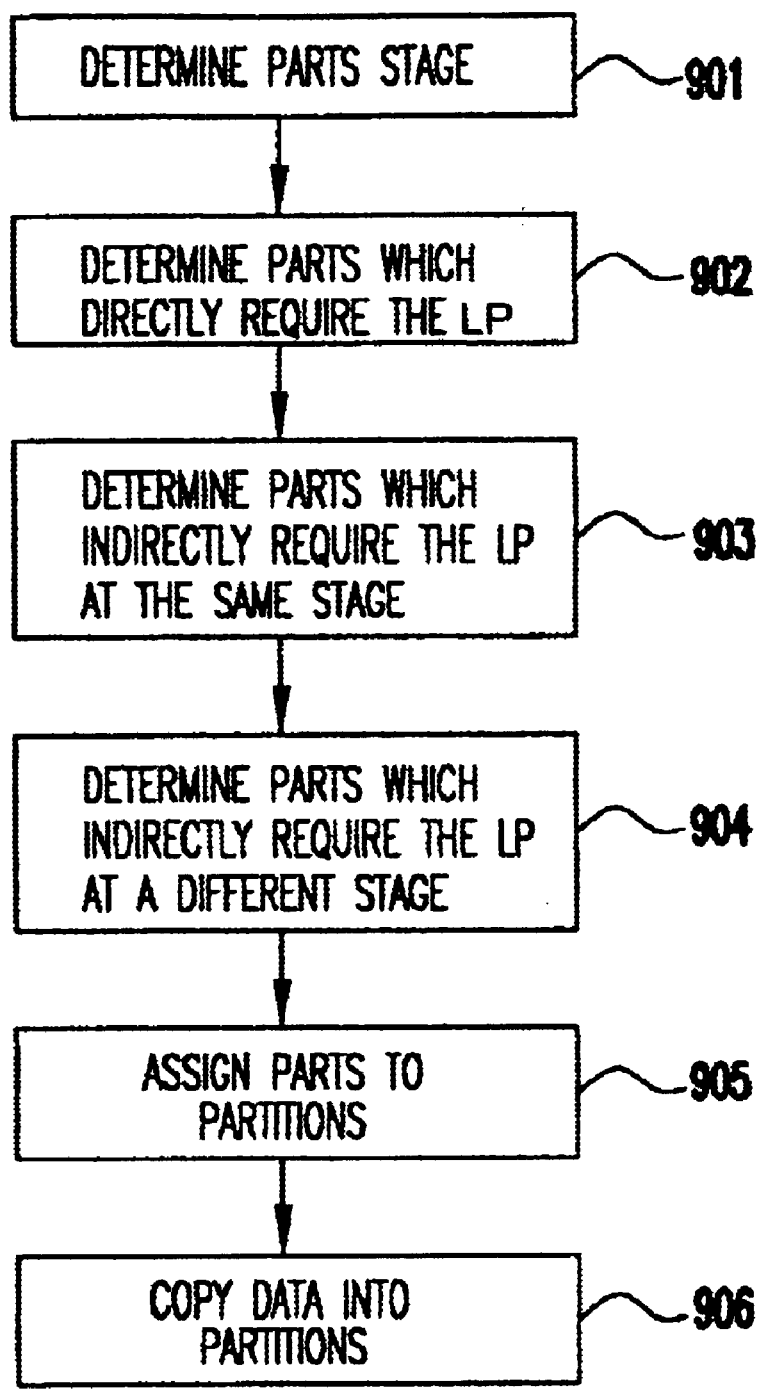
FIG. 9 shows a flowchart implementing sub-steps of step 801 of FIG. 8.

FIG. 9 shows a flowchart implementing sub-steps of step 801 of FIG. 8. In function block 901, a determination of the PN's manufacturing stage (e.g. Card, Module or Device) is provided. The function block 901 may be implemented in several different ways. In one implementation, the stage of the part may be directly retrieved from a user supplied input file which specifies the stage of each PN. An alternative implementation may include the user maintaining two input files including (i) a file which defines the part-type of each PN and (ii) a file which defines which part-types belong to which partitions.

In function block 902, a determination is made of which parts directly require LP processing because of their inherent complexity. Parts are considered inherently complex, and thus directly require LP processing, if they meet one or more of the below conditions:

the part may be built using more than one process at a given plant during a same time period, the part may substitute for or be substituted by another part which does not share a same binning process, or the part is designated by a user-specified input file as requiring LP processing.

Regarding the last of these three conditions, one situation in which a user may want to specify a PN as requiring LP processing is when there are alternate sourcing possibilities of sufficient complexity that the user is not comfortable that the heuristic will yield high quality sourcing results. In such a situation, the user would simply designate the appropriate PN(s) as requiring LP processing. (U.S. Pat. No. 5,943,484, incorporated herein in its entirety by reference, shows examples of the first two conditions.) In any event, function block 902 examines the three above conditions to determine a set of PNs which directly require processing by an LP. The set of PNs is provided as input to function block 903.

In function block 903, parts which are connected to the inherently complex parts through the BOM file are searched by the present invention. This involves searching up and down the BOM file until all parts connected to the original set of parts (determined in function block 902) have been found by the present invention. All of these connected parts are also identified or marked as requiring LP processing. (See U.S. Pat. No. 5,943,484.) This up-and-down searching is performed only for parts which have the same stage. However, once these LP parts have been determined, function block 904 explodes this set of parts downward through the BOMs to determine parts from other stages which should also be processed within the LP at the current stage. These other-stage parts are only considered if they have either their stage or part-type specified in an input file as being eligible for this explosion for the current stage. For example, if the module stage is being processed, then it may be that parts of type DEVICE but not parts of type WAFER are considered as candidates for becoming LP parts through the explosion. At the conclusion of function block 904, the parts which require LP processing at the current stage are then known which meet one of the following three criteria:

part which is inherently complex (as determined in function block 902), part determined indirectly complex through up-and-down BOM searching at the same stage (as determined in function block 903), or part determined indirectly complex through downward BOM searching at a different stage (as determined in function block 904).

Figure 1:
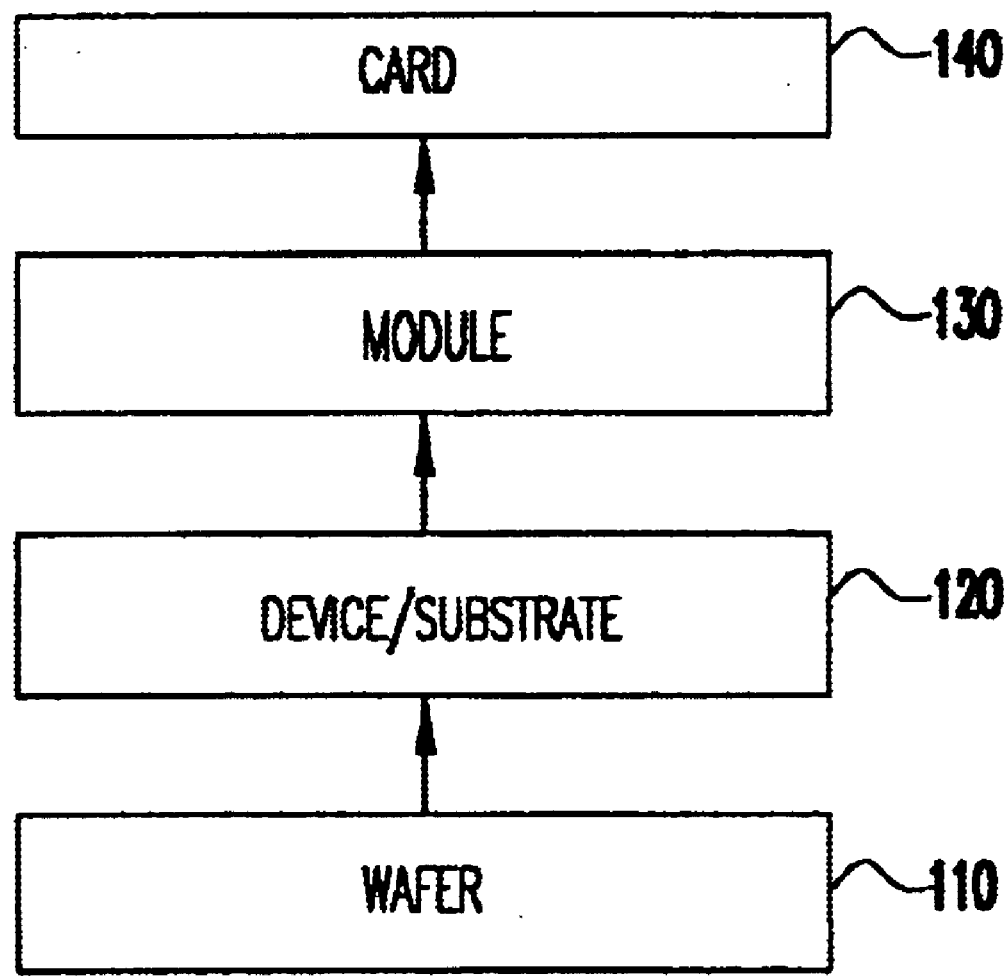
FIG. 1 is a high level block diagram showing steps for semiconductor manufacturing.
Figure 2:
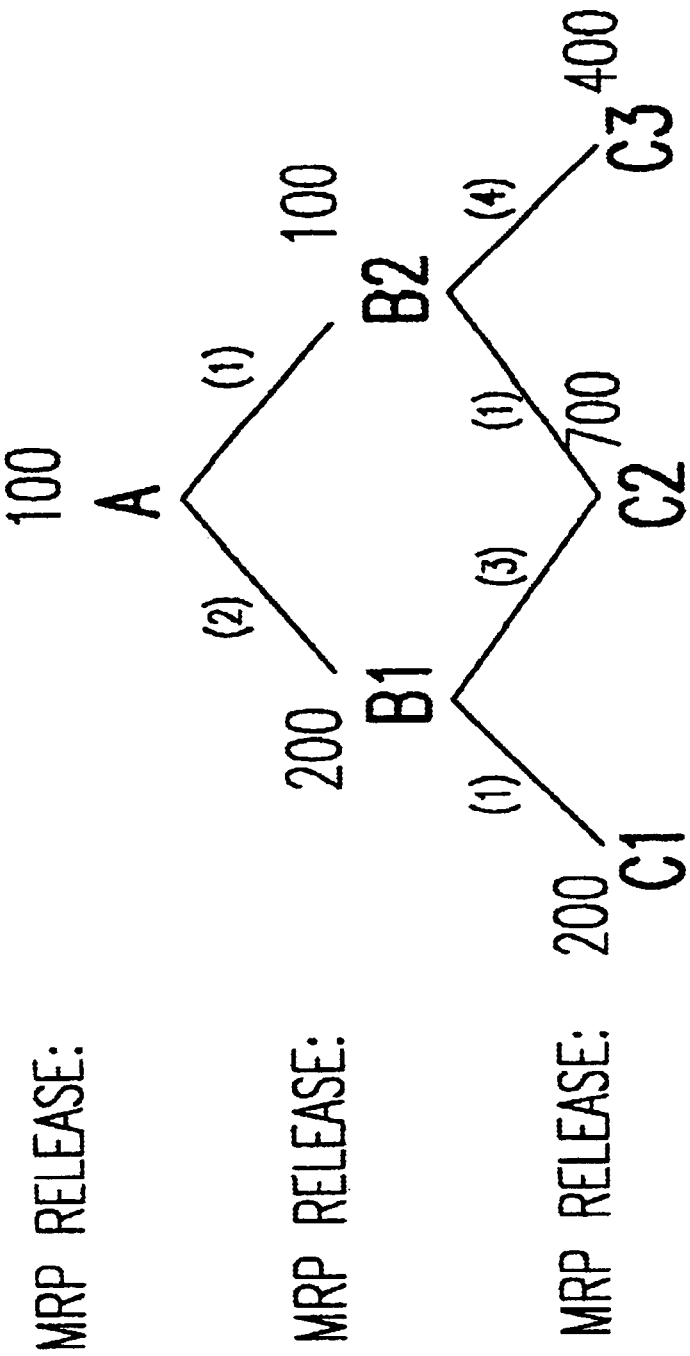
FIG. 2 shows an example of a two level Bill of Material (BOM) tree used for supporting material releases within a manufacturing system.
Figure 3:
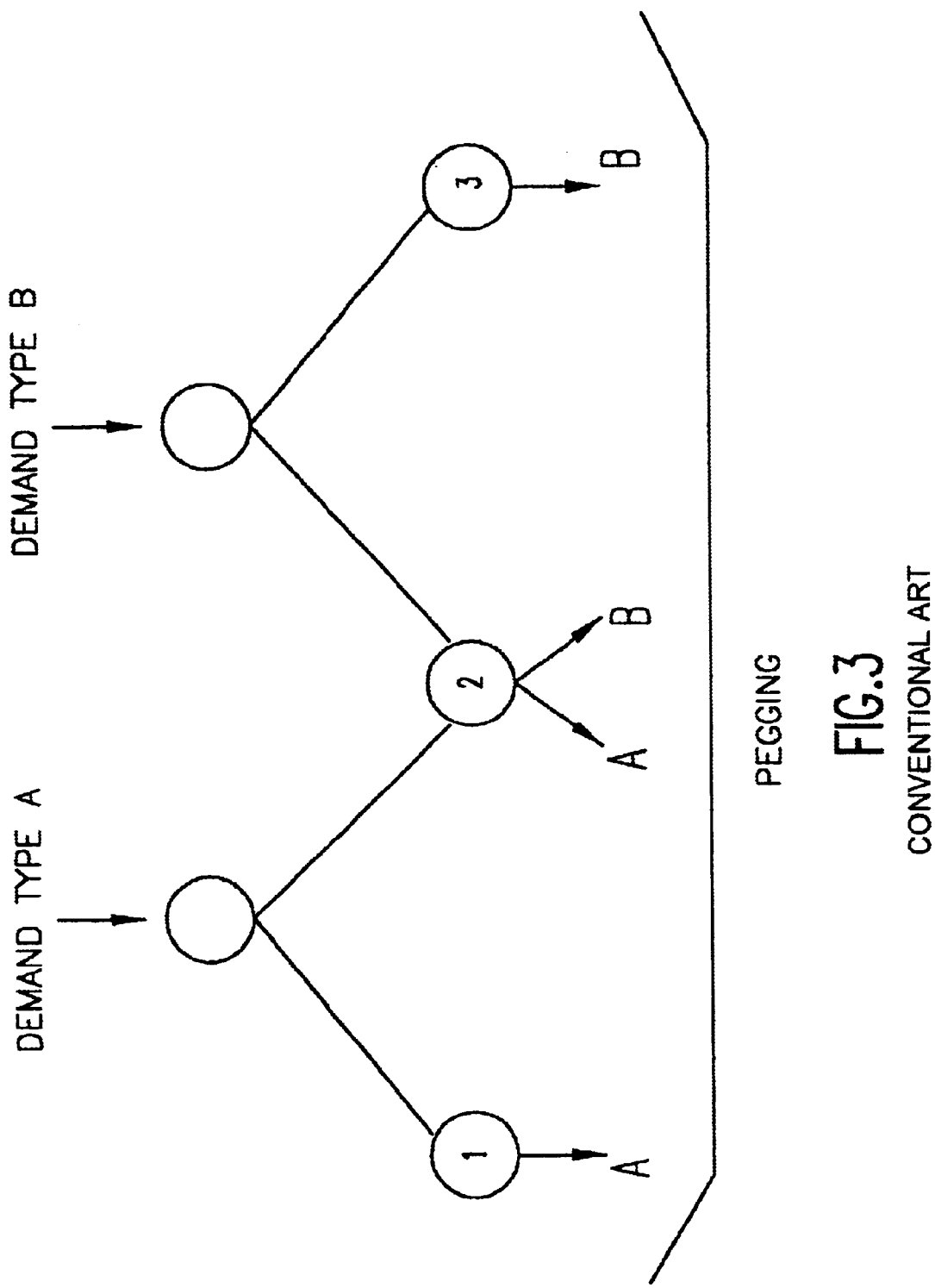
FIG. 3 shows an example of pegging.
Figure 4:
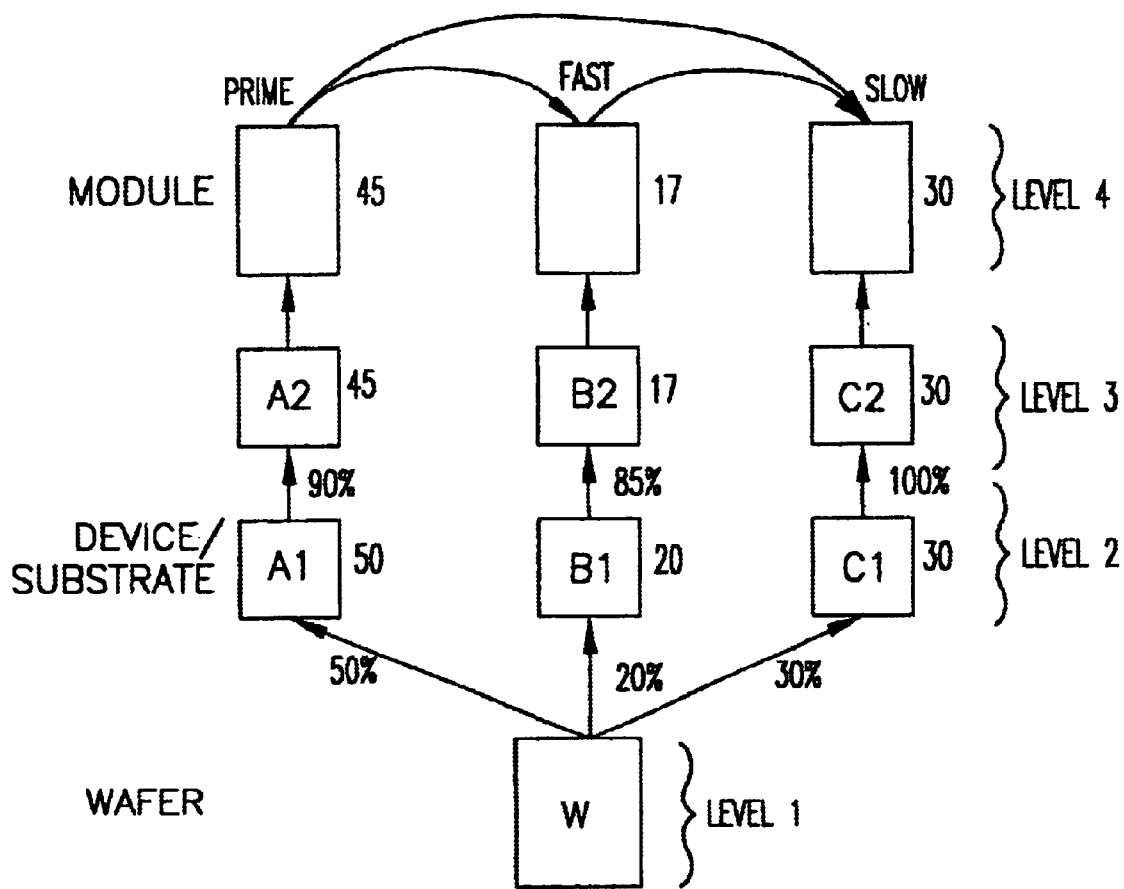
FIG. 4 shows an example of manufacturing information with a high level example of binning and substitution of the module, device and wafer stages of FIG. 1.
Figure 5:
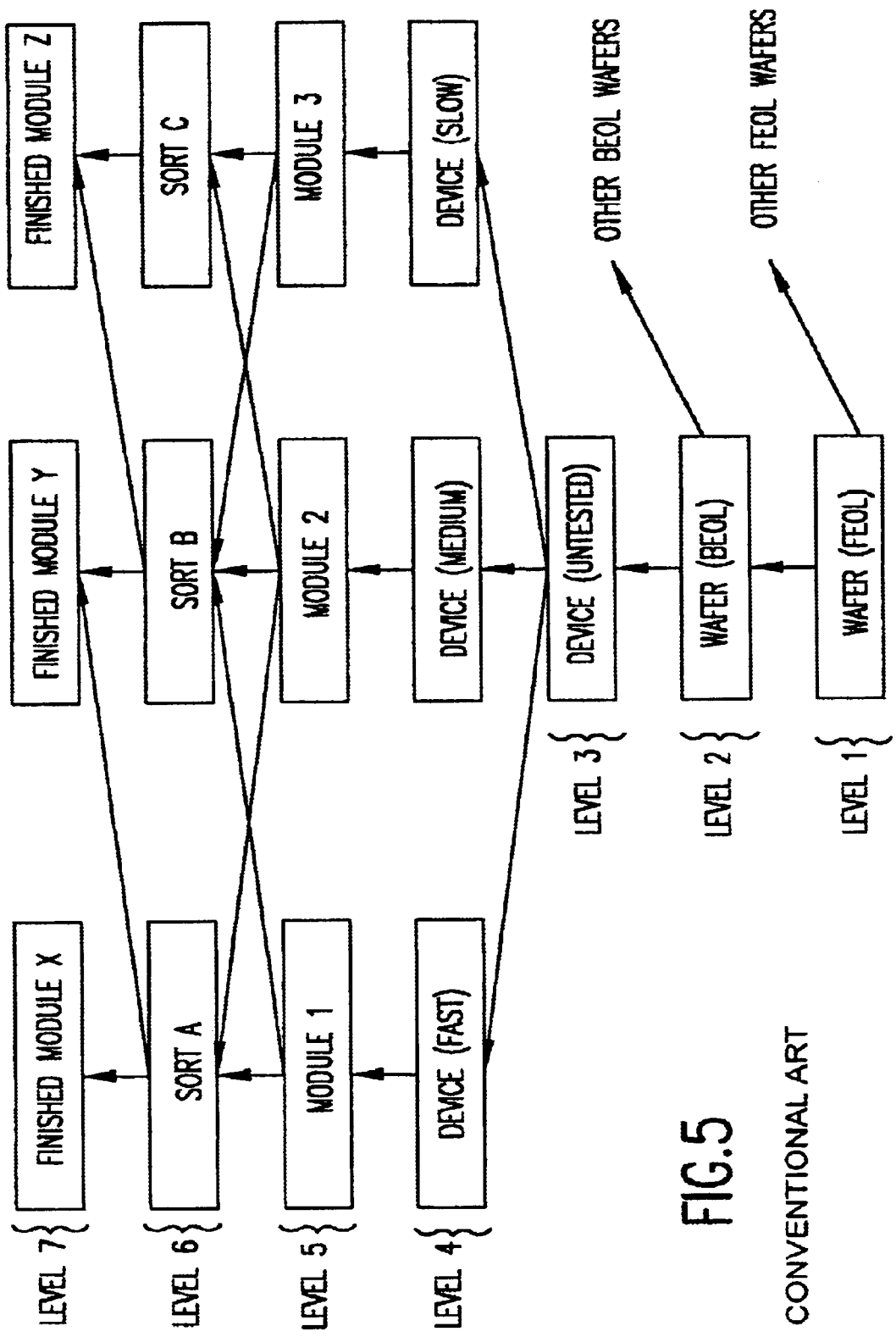
FIG. 5 shows an example of double speed sorting of devices and modules.

In function block 905, parts are assigned to partitions based upon their stage and also whether they require LP processing at a given stage. Parts which have not been identified as requiring LP processing are assigned to a heuristic partition by default. Parts which are identified as indirectly complex through the different stage processing of function block 904 will become assigned to two (or more) partitions. For instance, the untested device of FIG. 5 (double speed sorting) would be placed into the Module-LP partition and also in a device partition. Assigning the untested device to the Device-LP or Device-H partition depends on whether it would be classified as an LP part according to function blocks 902 and 903 when the device stage is considered.

When the untested device is later processed within the Module-LP partition, it is planned for the purposes of considering its affect on the production plans of parts within the module stage. After the Module-LP partition is planned, that plan for the untested device will be discarded. The untested device will need to be planned again using the complete demand which may include exploded demand from both the Module-LP and the Module-H partitions. This ability of the present invention to process a single PN in multiple stages and partitions represents an advantage over prior art such as that of Leachman (1996).

In function block 906, a final preprocessing step is provided where all the appropriate PN data is copied into the relevant directory based upon the partition(s) assigned to each part in function block 905. Although capacity data is shared across multiple partitions, at this step of the processing, the complete capacity files are copied into each partition. For now each partition will act as if it has the ability to use the total capacity available.

The Explosion Step

Figure 10:
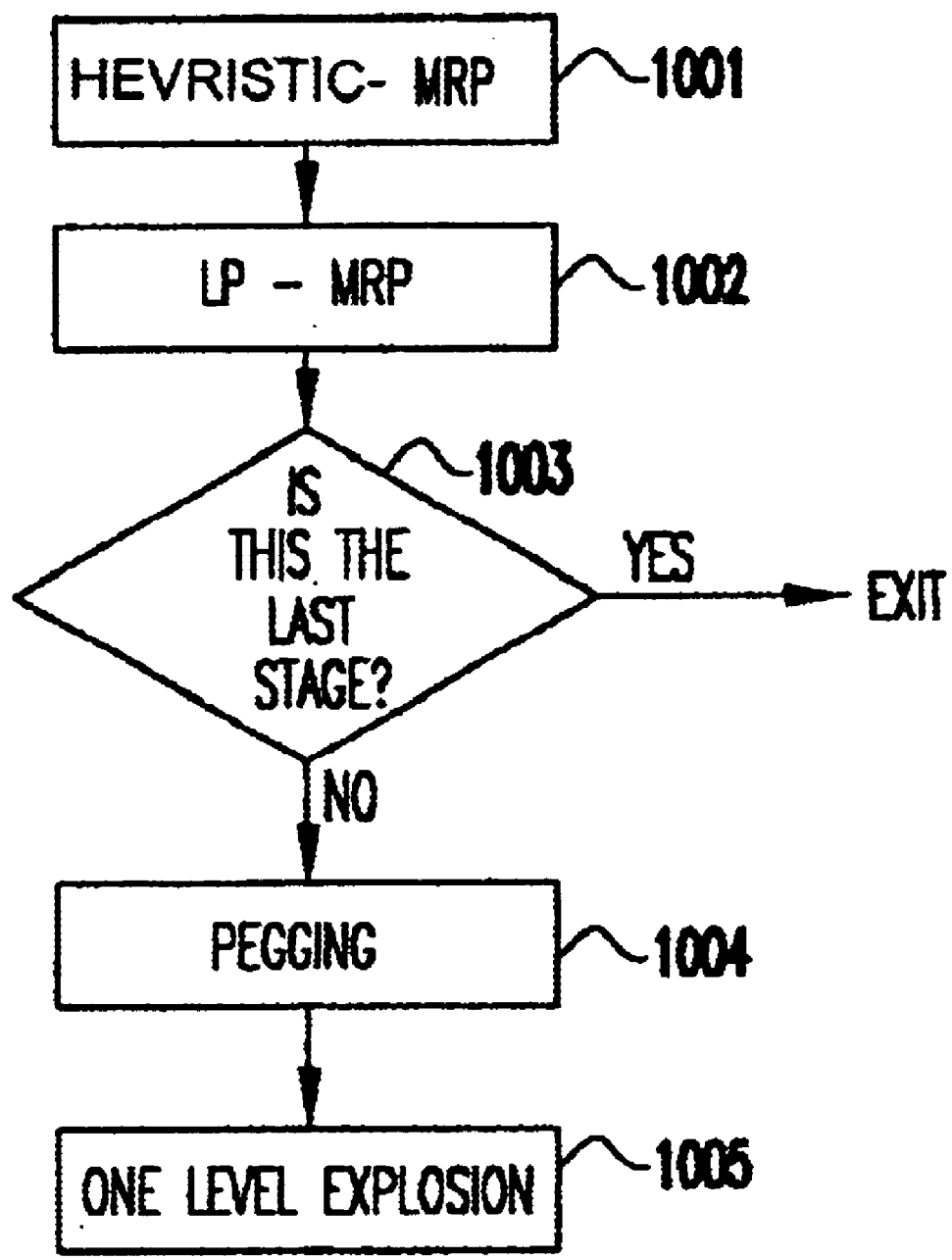
FIG. 10 shows a flowchart implementing sub-steps of step 802 of FIG. 8.

FIG. 10 shows a flow chart implementing the sub-steps of the explosion function block 802 of FIG. 8. The logic of FIG. 10 may occur for each stage (for example, for the Card, Module, and Device stages).

In function block 1001, a heuristic MRP calculation is performed in the heuristic partition of the current stage. In the present invention, the MRP calculation will pass demand attribute information (e.g., demand priority, booked_or_ non_booked_order_indicator) from the top to the bottom of the BOM for the stage. The demand attribute information is passed by mapping each demand against the assets which satisfy it and then passing this information through the BOMs explosions. This allows the demand attribute information of one manufacturing stage to be later passed to subsequent (lower level) stages.

In function block 1002, an LP is performed in the linear programming partition of the current stage. (This could include some parts from other stages as indicated in block 904 of FIG. 9). Linear programs, by their nature, produce only feasible solutions; however, feasible solutions are not completely desirable in this MRP context where it is important to pass the "true need" to lower level stages regardless of whether or not that need/demand may be satisfied on time (feasibility is achieved later during the forward implosion step in function block 803). This is because the timing of when dependent demands are due at the next (lower) stage influence their relative priority. For instance, if one dependent demand is due today and another dependent demand was due three days ago, the overdue demand should be treated as having a more pressing priority (all else being equal). Consequently, in function block 1002, the inputs feeding the LP are adjusted to relax the LP model and simulate the LP behaving as if activities can be done in the past. This requires that the LP run with a time horizon that begins in the past (e.g., six months or some other time in the past). It also requires that the date effective data be adjusted so that records that are effective as of today are treated as if they are effective from the beginning of the planning horizon through today. This applies to yields, cycle times, binning, and other date-effective data.

Because this (input adjusted) LP behaves with the ability to conduct actions in the past, it yields results which would normally be considered temporally infeasible (which is what is desirable in this MRP context). However, the LP is run with capacity (albeit with full capacity available) so that capacity constraints at this stage are reflected in the dependent demand passed to lower level stages. There are advantages and disadvantages of including capacity within this LP run and those skilled in the art should be able to apply the steps of the present invention with or without including capacity dependent upon their particular application and business situation.

Recall that the LP for the current stage may include the data of some parts which exist at lower-level manufacturing stage(s). For instance, referring to the double speed sorting example of FIG. 5, the data of the untested device may be considered in the (current stage) Module-LP run even though that device would later be processed in its own partition. Consequently, as a final activity of function block 1002, once the LP has completed executing, it may be necessary to remove the data of any lower level stages. That is, continuing with the example, the present invention would remove the untested device data from the Module-LP partition (since these PNs will be processed in the device stage).

More generally, the present invention would remove data from any parts previously added to the current partition by function block 904 of FIG. 9. These removed parts may later be processed when their own manufacturing stage is processed. In addition, note that these removed parts will not need to be processed in the current partition when implosion processing later occurs. For the current stage, the (downstage) parts only need to be considered during the explosion processing. It is noted that while making (explosion) decisions at the current stage, there is still flexibility about what decisions will be made at lower level stages. Consequently, during the LP explosion, the current stage can be optimized by exploiting the available flexibility at the lower level stages. However, by the time the current stage is processed in the imploding step, the lower level stages may already have been processed and the current (higher level) stage no longer has the flexibility to alter the decisions previously made at lower level stages. With the downstage flexibility elapsed, the implosion processing of the current stage takes the supply available from downstage as fixed. At that point, it is too late to make further adjustments downstage.

In function block 1003, a determination is made as to whether the final stage of explosion processing is provided. If so, the explosion activities within function block 802 of FIG. 8 is completed. If not, then there are remaining stages to explode and further preparation is required. This preparation may be accomplished by performing pegging calculations in function block 1004 and a one-level-explosion in function block 1005. In function block 1004, a novel pegging calculation is performed to pass demand attribute information (e.g., demand priority, booked_or_not_ booked_order_indicator) from the top to the bottom of the stage's bills of materials for the LP partition. This should be performed so that when lower level stages are processed they may do so with the correct demand priority and nonlinear business rules.

In function block 1005, the manufacturing releases at the bottom of the bills of materials in the current stage are exploded to create dependent demand for parts at the top of the BOM in the next (lower level) manufacturing stage. The manufacturing releases from both the Heuristic and LP partitions are combined and then exploded. This one level explosion is done in a way such that the demand attribute information associated with the manufacturing releases (as obtained in the pegging logic as an example) is passed along to the dependent demand of the next stage. As a result, the next stage has demand attribute information implicitly derived from the end-item demand and thus is able to reflect that information in its decision making.

A subtlety of the one level explosion of function block 1005 is that the dependent demand resulting from the current stage resembles independent demand when later processed at subsequent stages. Consequently, this dependent demand is reformatted as an independent demand. Furthermore, depending on the implementation, it may be necessary to create "dummy demand locations". This may have to be performed when implemented on a system which makes it necessary to differentiate between manufacturing plant locations and demand locations. For instance, suppose one stage needs components planned in another (lower level) manufacturing stage and that the assembly stage needs those components at manufacturing location 0342. The present embodiment will convert that manufacturing location 0342 into a dummy demand location, e.g., X342, and also create a record (in another file) which indicates that the part may be shipped from plant location 0342 to demand location X342 with zero shipping lead time and zero cost. With the independent demand file formatted and populated in this manner, the lower level stages will be processed appropriately using business-as-usual software.

The function block 1005 has been described as a one level explosion from the bottom of one manufacturing stage to the top of the next manufacturing stage; however, it is also possible that the explosion of some manufacturing releases will pass exploded demands to parts which are further down the bills of materials supply chain, i.e., in the middle of the next stage's bills of materials or possibly even in a stage beyond the next stage. These possibilities do not fundamentally change the logic of the present invention.

Prior to discussing the pegging logic of the present invention, it is necessary to define the following terms:

Assets: inventory or anything which increases inventory at a PN, plant. Examples of assets include inventory, WIP, and the production resulting from new manufacturing releases.

Needs: anything which results in a planned issue or disbursement from inventory at a PN plant. Examples of needs are shipments to customers and component disbursements to satisfy an assembly's manufacturing release. If PN X is substituting for PN Y, then the substitution is an asset from the point of view of part Y and a need from the point of view of part X. Similarly, if a PN is being shipped from manufacturing plant W to manufacturing plant Z, the inter-plant shipment will be an asset from the point of view of plant Z and a need from the point of view of plant W.

The assets and needs files corresponding to a production plan are available as a result of the LP and Heuristic processing (function blocks 1001 and 1002 of FIG. 10). However, the pegging logic of block 1004 requires, and uses, only the assets and needs files resulting from LP processing (function block 1002).

Figure 11:
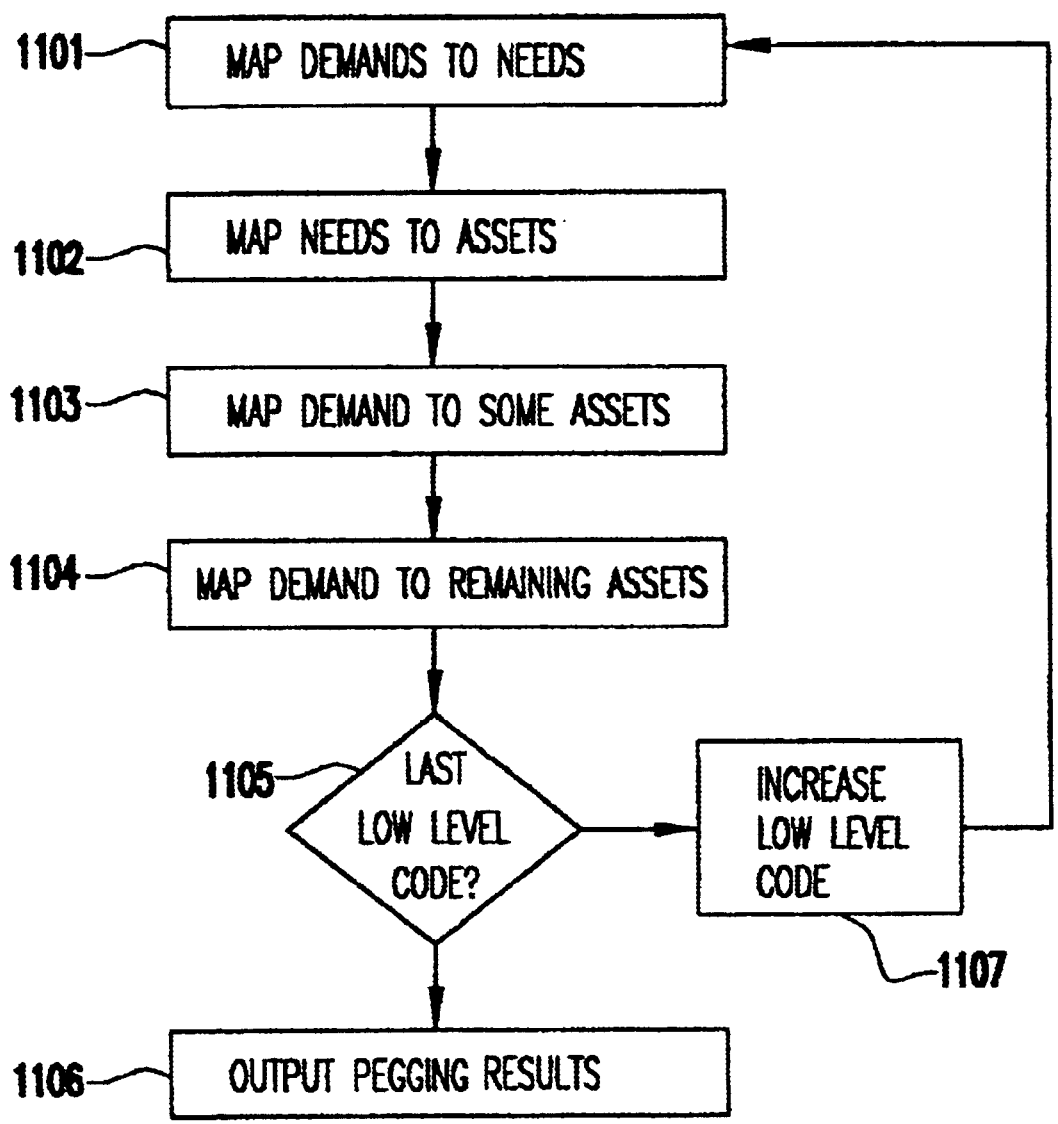
FIG. 11 shows a flowchart implementing the sub-steps of step 1004 of FIG. 10 for a given low-level-code.

FIG. 11 shows a flowchart implementing the sub-steps of step 1004 of FIG. 10 for a given low-level-code. As with MRP, the pegging calculations need to proceed in low level code sequence. The calculations begin by pegging demands at the top of the bills of materials (at the end-item level) to their supporting needs, and then supporting assets, and then "explode" the pegging throughout the bills of materials supply chain level by level. Most of the steps of FIG. 11 involve comparing two files and detecting how they map against each other.

Specifically, function block 1101 of FIG. 11 maps the demands against the needs. That is, function block 1101 finds which needs (inventory disbursements) are supporting which demands. The mapping of these two items is based on the fields which are determined as fixed by the LP. For instance, it may be that the LP implementation provided needs for customer shipments which are defined by PN, shipping plant location, time period, customer and customer demand class priority. If each of these fields is fixed (i.e., PN, plant, period, customer, priority) in the needs file output by the LP, then the matching occurs on those demands which have fields matching those fixed fields. Where there are multiple demand records matching those fixed fields, the mapping will occur assuming the demands are supplied in due date sequence (or some other rational priority sequence which would depend upon which fields are fixed in the LP embodiment). The output of the mapping may be a file where each record contains detail from the original demand and need records and also the quantity of that need record which is being used to satisfy the demand. Notice that there is a many-to-many relationship in that one need may satisfy multiple demands and one demand may be satisfied by multiple needs.

A similar mapping logic occurs when function block 1101 maps dependent demands (where dependent demand is demand that results from external demand on PNs at higher level in the BOM) to the needs satisfying the dependent demands. One difference is that instead of mapping such needs directly to the dependent demands, the result of the function block will be a mapping between the needs and the end-item demand attributes supported by those dependent demands. The dependent demand mapping only begins to occur at low-level-code two at which time the mapping between end-item demand and the (low-level-code one) manufacturing release assets supporting those end-item demands will already have occurred and thus be available to facilitate the mapping of the function block 1101 (dependent demand) needs to those end-item demands they are supporting.

Figure 12:
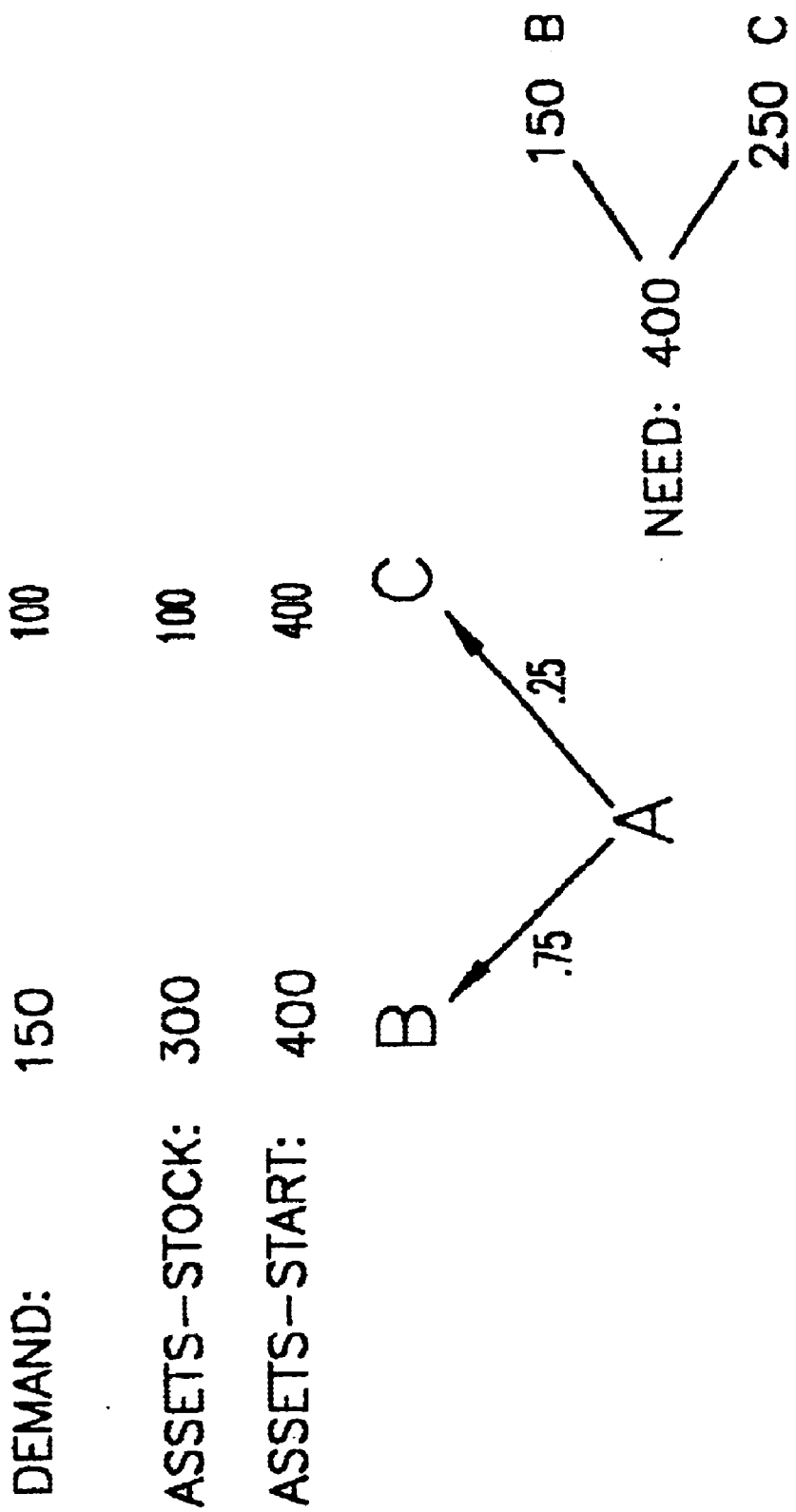
FIG. 12 shows a binning example with pegging as applied to the present invention.

The mapping of function block 1101 may become more interesting in a situation where the demand being mapped is a dependent demand resulting from a binning situation. For example, suppose that part "A" bins to create output parts "B" and "C" with binning percentages of 75% and 25%, respectively, and that each part has 100% yield and bill-of-material-qty-per, where the latter is defined as the quantity of component required for a given assembly to release one unit. This example is shown in FIG. 12. For illustrative purposes, the demands on "B" and "C" are 150 and 100, respectively. Also, 400 pieces of part "A" are built so that part "C" can satisfy its demand. In this example, the asset stock quantities would be 300 and 100 for "B" and "C", respectively, and each would have an asset release quantity of 400. All 400 pieces of the part "C" asset release quantity would be used to satisfy its demand. However, only 200 of the part "B" asset release quantity would be used to satisfy its demand (200=150 demand divided by 0.75 binning percentage) while the remaining 200 assets are excess. Prior to the execution of function block 1101 at the low level code containing part "A", the user would already know that half of the part "B" asset release quantity are pegged to its demand while all of the part "C" asset release quantity is pegged to its demand. Since part "A" simultaneously produces 400 pieces for "B" and "C", half of these are being used to satisfy demand for both "B" and "C" and the other half are being used only to satisfy demand for part "C". Consequently, half of the 400 pieces for "A" should be pegged or mapped to the demand attributes of the demand for "B" and "C" on a 75/25 prorated basis while the other half of the 400 pieces for "A" should be pegged only to the demand attributes of the demand for "C". This results in 150 pieces of the part "A" need being pegged to the demand attributes of the part "B" demand and the remaining 250 pieces of the part "A" need being pegged to the demand attributes of the part "C" demand. In general, when a PN is a component of a binning process, it is helpful to prorate its needs appropriately among the demands its assemblies are supporting.

However, in some contexts, it may be better to assign the component's needs to the most important demand of the assembly demands it is supporting. For instance, suppose that in FIG. 12 the demand for part "B" has a higher priority than the demand for part "C". In this situation, rather than assigning 150 pieces of the part "A" need to the demand attributes of the part "B" demand (as done via prorating), it may be better to assign 200 pieces of the part "A" need to the demand attributes of the part "B" demand. The latter approach provides an advantage in that all 200 pieces in that half of the part "A" job is required to be released to fully satisfy the part "B" demand; thus, the latter approach ensures that the part "B" demand results in its total quantity required being passed to the next level of the bills of materials with its priority in tact. The drawback of the latter approach is that it does not appropriately differentiate between situations where, for example, parts "B" and "C" may be made from multiple components each with its own set of binning percentages (whereas the prorating approach would do so). It is noted, that each of the approaches can be equally implemented by the present invention.

Referring again to FIG. 11, in function block 1102, the needs are mapped against the assets supplying the needs. The underlying assumption of this mapping is that items are disbursed from inventory (needs) in the same sequence that they went into inventory (assets). Thus, the assets and needs are sorted by receipt_into_stock_date and issue_date, respectively, as the first step in mapping the two files. As with the earlier mappings, this mapping should recognize the many-to-many relationship and output how much of each asset is supplying each need. In the case of manufacturing release assets, it may be necessary to keep track in the mapping of the portion of the manufacturing release quantity which is supporting the portion of the stock quantity contained in the mapping file. In so doing, it is assumed that the same yield applies to all pieces within the asset and thus are able to conduct a simple proration of the release quantity based on the percentage of the stock quantity applicable to the particular need. Note that there may be some assets which do not support needs and instead sit indefinitely in inventory. Such assets may be caused by binning and should be flagged as "excess" in the mapping file.

In function block 1103, the assets are mapped against the end-item demands they are supporting. This is performed by first marrying the output of function block 1101 (demands mapped to needs) with the output of function block 1102 (needs mapped to assets) for those needs which directly satisfy independent demand or dependent demand. Again, this mapping should recognize the many-to-many relationships.

At this point, substitutions and inter-plant shipments have not yet been considered by the present invention. Consequently, function block 1104 will take the assets from the output of the mapping of function block 1103 and find any corresponding needs which are supporting those assets through substitutions and inter-plant shipments. The demands which support those assets are then mapped against the needs supporting those assets and finally against the assets supporting those needs. As a result, all assets (at the current low level code) are pegged or mapped against the end-item demands they are supporting. (It may not be necessary to keep the full demand information in these pegging calculations, but instead only the demand attributes may be kept which are important for prioritization purposes such as demand class and whether the demand represents a booked order.)

In function block 1105, a determination is made as to whether the final low-level-code is processed during the pegging calculations of the current manufacturing stage. If so, then the relevant pegging results are output into a file in function block 1106 which contains the manufacturing releases (one type of asset) and the attributes of the demand they are supporting so that this mapping may be used in function block 1005. Otherwise, the present invention is finished with this low-level-code and thus increments the low-level-code counter in function block 1107 and proceeds to process the next low level code in function block 1101.

The Implosion Step

Figure 13:
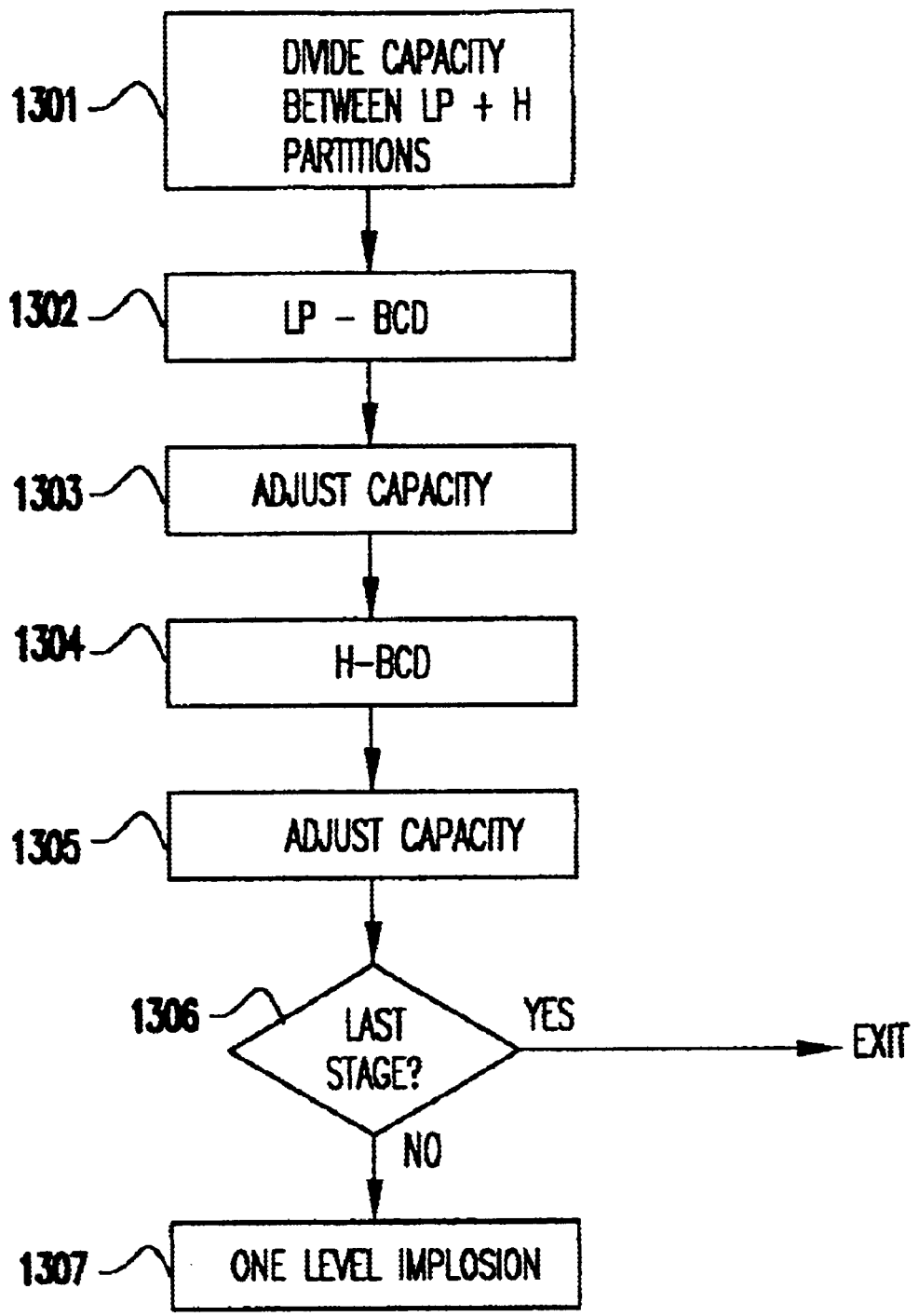
FIG. 13 shows a flowchart implementing the sub-steps of step 803 of FIG. 8.

FIG. 13 shows a flowchart implementing the sub-steps of the implosion function block 803 of FIG. 8. As described above, function block 803 refers to the implosion logic where either a Heuristic-Best-Can-Do (H-BCD) or an LP is run at each stage and the appropriate information is passed upwards between the stages. This logic occurs for each stage (for example, for the Card, Module, and Device stages).

In function block 1301 of FIG. 13, the capacity is divided between that available for the LP partition and that available for the H-BCD partition. First the capacity requirements required to support the manufacturing releases generated for the partitions in function blocks 1001 and 1002 are calculated (referred to as "exploded_capreq" since they support the manufacturing releases calculated during the explosion processing). A natural division of the available capacity would be to split between the two partitions based upon a proration of their exploded_capreq. So, if the LP had an exploded_capreq half the magnitude of the heuristic, for example, then the LP would receive one third of the available capacity. However, this type of capacity division would tend to result in the LP using less than its prorated share. That is because the LP would be forced to use less than or equal to that amount, and since there are likely to be some periods where the LP could not or would not need to use that amount, it would likely use less than its prorated share. In the preferred embodiment, the capacity available for the LP in a given time period is the maximum of the below three amounts:

- its prorated share based on the exploded_capreq in the current time period
- its prorated share based on the total exploded_capreq which exists in the current period, the previous time period, and the next time period
- its prorated share based on the total exploded_capreq throughout the horizon By using the maximum of the above numbers, it is ensured that in every time period the LP receives an available capacity which is at least equal to its prorated share during the current, intermediate, and long-term time horizons. This is useful because the capacity required by this LP will be different (especially in timing) from that used by the LP which ran during the explosion processing. This is because this LP is constrained to be feasible during implosion processing while the other LP ran essentially unconstrained (looser capacity, activities in the past). Furthermore, using a maximum of the three numbers means that, on average, the LP will utilize more closely its available capacity than the prorated share of capacity in a given period. This mitigates the fact that the LP will be unlikely to utilize all of its available capacity.

Those skilled in the art should recognize that any number of variations could be made to the above maximum calculation. Some of these variations may be more complex and others more simple. For example, an alternative embodiment may include (a) choosing to implement a solution containing a maximum of two values, or perhaps the maximum of five values or (b) using time weighted averages instead of the simple averages used in the components of the above formula. All of these possibilities are contemplated by the present invention.

In function block 1302 of FIG. 13, an LP is performed in the linear programming partition of the current stage. Unlike the LP run during the explosion processing, this linear programming execution preferably considers only PNs from the current stage. Furthermore, while the explosion LP simulated a run in the past, the LP of function block 1302 will be capable of executing with a planning horizon strictly in the future. That is, the results of this LP run will be feasible. It should be achievable assuming its input data is correct and accurate, i.e., it is a "best can do" production plan.

In function block 1303, the capacity required to support the manufacturing releases generated by the LP in function block 1302 is calculated. These capacity requirements are subtracted from the total capacity available and provided as a new capacity available file for the heuristic to use in function block 1304. In function block 1304, the Heuristic Best-Can-Do (H-BCD) is performed for the current manufacturing stage. The manufacturing releases generated by the H-BCD are then used in function block 1305 to calculate the capacity required to support those manufacturing releases. These capacity requirements will then be subtracted from the remaining available capacity so that any subsequent stages will, preferably, have only that remaining capacity available for their processing.

In function block 1306, a determination is made as to whether the final (topmost) stage of implosion processing has been performed. If so, then the implosion activities implied within function block 803 of FIG. 8 are completed. If not, then there are remaining stages to implode and preparations are made for those other stages. These preparations are made by performing a "one level implosion" calculation in function block 1307.

The one level implosion of function block 1307 first takes the customer shipment files of the LP and Heuristic partitions at the current stage and consolidates them into a single customer shipment file. This file may be thought of as component supply useable for assembling at the next (higher level) stage. This component supply is then allocated to manufacturing releases for the next stage assembly. The resulting feasible assembly manufacturing releases are then reformatted for the next level stage heuristic partition as fixed manufacturing releases and are fed to the next level stage LP partition as receipts associated with a dummy PN which is inserted into the BOMs for the next stage as a sole component of the original assembly PN. This is performed because the H-BCD, processing one PN at a time, cannot do any better in determining the release schedule than the one level implosion; the LP, however, may simultaneously consider multiple bills of materials levels of PNs and thus may want to re-optimize slightly differently than that done by the one level implosion. For more details on the logic of one level implosion, see U.S. application Ser. No. 09/891,850 assigned to the common assignee and incorporated herein by reference in their entirety.

The Postprocessing Step

Function block 804 of FIG. 8 addresses the postprocessing required after all the other processing activities (explosion and implosion) have taken place in their respective partitions. In the function block 804, the results of the various partitions are consolidated and formatted to present a single coherent view to the user. For instance, at the conclusion of the implosion process of function block 803, there may be manufacturing release files in each of the partitions. In function block 804, these separate manufacturing release files are combined, sorted, and the resultant placed into a single manufacturing release file. Similar consolidation may occur for many other files. Some of these files may contain dummy PN or dummy location data within the partition. In such a case, the such dummy data may be removed from the files before the files are consolidated.

Creating coherent reports is more involved. To create coherent reports the core data from the consolidated output files is used to create the appropriate reports. As a result, the user will have output reports and files which look as if they were generated by a single run. This is preferable for the user who may want to search by PN, for instance, and may not know (or want to know) the details of how the part was planned across the various partitions.

In addition to the above, there are several additional user interface features which are contemplated by the present invention. These additional features may include, for example, (i) the ability to make modification/perturbations and new additions to existing input data, (ii) save and/or archive production plans and (iii) perform consistency checks on input data. The graphical user interface allows users to run the model interactively, i.e., to have the opportunity to make incremental "what-if" type questions. Thus, the present invention can be used as a simulation based tool for detecting, monitoring and optimizing the impact of committing limited supply and capacity to new future demands. This simulation/scenario based planning approach provides many apparent advantages to the implementation of the present invention.

Conclusion

The present invention uses a two pass system, i.e., backward (explosion) and forward (implosion), to generate a production plan. The first pass starts with finished products in the first stage, and uses demand information to project backwards to determine implied dependent demand. This may be performed using either an LP model, for complex PNs and BOM structures, or a heuristic model in less complex cases. In either case, the model is applied to generate a production plan for the given stage. The output is a set of material requirements which are pegged to order type information such as customer class to gauge relative importance of the different material requirements for use in formulating the next stages in the production planning problem. This process is recursively applied, moving backwards through the stages to determine MRP type (uncapacitated) requirements. The second pass starts at the bottom of the BOM and moves forward stage by stage. In each stage, the material requirements from the first pass are met as closely as possible given additional constraints resulting from limited supply availability and capacity resources.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for computing a production plan for part numbers (PNs) throughout a bill of material supply chain, comprising the steps of:

separating a bill of materials (BOM) into separate manufacturing stages;

partitioning each manufacturing stage of the separate manufacturing stages into a heuristic processing and a linear programming processing partition;

assigning PNs to the partitioned manufacturing stages;

calculating for the each manufacturing stage a Material Requirements Planning (MRP) production plan using either the heuristic processing or the linear programming processing depending on the partitioning step;

calculating for the each manufacturing stage a best-can-do production plan using one of the heuristic processing and the linear programming processing depending on the partitioning step; and preparing MRP production solution information to be passed recursively at least one of forward and backward to a manufacturing stage of the separate manufacturing stages based on the best-can-do calculating step.

2. The method of claim 1, wherein the each manufacturing stages are defined by a specific manufacturing stage with respect to the BOM.

3. The method of claim 1, further comprising the step of:

determining whether a part associated with the PNs requires the linear programming processing due to the part's inherent complexity, wherein the inherent complexity of the part is based on at least one of:

the part being built using more than one process at a given plant during a same time period, the part being a substitute for or being substituted by another part which does not share a same binning process, and the part being designated by a user-specified input file as requiring the linear programming processing.

4. The method of claim 3, further comprising the steps of:

searching up and down the BOM to determine which parts are connected to the inherently complex parts within a manufacturing stage; and marking the connected parts for the linear programming processing.

5. The method of claim 4, comprising the step of:

exploding the connected parts downward through the BOM to determine parts from other manufacturing stages which should be processed within the linear programming processing at a current manufacturing stage.

6. The method of claim 5, further comprising the steps of:

providing a backward linear programming processing for the part in a current manufacturing stage linear programming processing partition;

providing the heuristic processing for the parts in a current manufacturing stage heuristic processing partition; and incrementing the current manufacturing stage to a next manufacturing stage, when the current manufacturing stage is not a last manufacturing stage.

7. The method of claim 6, wherein the heuristic processing partition is provided by default when the part is not processed by the linear programming processing.

8. The method of claim 6, wherein:

the linear programming processing and the heuristic processing pass demand attribute information from a top to a bottom of the BOM for the each manufacturing stage, the demand attribute information is passed by mapping each demand against assets which satisfy the demand and then passing the attribute information through the BOM explosions.

9. The method of claim 1, wherein the heuristic and linear programming processing at a given manufacturing stage are performed in parallel.

10. The method of claim 6, wherein the MRP-type linear programming processing runs with a time horizon that begins in the past.

11. The method of claim 10, wherein the MRP-type linear programming processing in the explosion step involves combining parts at lower level manufacturing stages into higher level manufacturing stages.

12. The method of claim 6, further comprising the step of imploding the BOM, wherein nonlinear decision rules are used between the manufacturing stages during the imploding.

13. The method of claim 6, further comprising the step of pegging to pass demand attribute information from a top to a bottom of the BOM within a partition such that a lower manufacturing stage of the separate manufacturing stages are processed with correct demand priority and nonlinear business rules and manufacturing releases from both the linear programming processing and the heuristic processing partitions are combined and then exploded.

14. The method of claim 1, wherein the separate manufacturing stages are substantially independent of one another.

15. The method of claim 13, further comprising the steps of:

mapping the demand attribute information against needs based on fields determined by the linear programming processing; and determining which of the needs support which demand attribute information, wherein the needs for customer shipments are defined by fixed fields including part number, shipping plant location, time period, customer and customer demand class priority, wherein matching occurs on the demand attribute information which have fields matching the fixed fields.

16. The method of claim 15, wherein the needs are further mapped against assets supplying the needs.

17. The method of claim 15, wherein the needs are further mapped against end-item demands they are supporting.

18. The method of claim 16, further comprising the steps of:

taking the assets from an output of the mapping and finding corresponding needs which support the assets through substitutions and inter-plant shipments;

mapping the demands which support the assets against the needs supporting the assets and against the assets supporting the needs such that all assets are mapped against the end-item demands they are supporting.

19. The method of claim 1, wherein:

dividing capacity between that available for the linear programming processing partition and the heuristic processing partition;

calculating the capacity requirements required to support manufacturing releases generated for the linear programming processing partition and the heuristic processing partition ("exploded_capreq"); and setting the capacity available for the linear programming processing in a given time period to a maximum of:

a prorated share based on the exploded_capreq in a current time period, a prorated share based on a total exploded_capreq which exists in the current time period, a previous time period, and a next time period, and a prorated share based on a total exploded_capreq throughout a time horizon.

20. The method of claim 19, further comprising the steps of:
calculating the capacity required to support the manufacturing releases generated by the linear programming processing based on the setting step;
subtracting the calculated capacity requirements from a total capacity available and providing a new capacity available for the heuristic processing; and
performing the best-can-do calculation using the heuristic processing for a current manufacturing stage.

21. The method of claim 1, wherein the production plan is performed interactively in a simulation based manner either standalone or using a graphical user interface.

22. The method of claim 1, wherein available capacity is divided between the linear programming processing and heuristic processing partitions in a manner which reflects short-term, near-term, and long-term capacity needs of the respective partitions.

23. A system for computing a production plan for part numbers (PNs) throughout a bill of material supply chain, comprising:
a module for separating bill of materials (BOM) into separate manufacturing stages;
a module for partitioning each manufacturing stage of the separate manufacturing stages into a heuristic processing and a linear programming processing partition;
a module for assigning PNs to the partitioned manufacturing stages;
a module for calculating for the each manufacturing stage a Material Requirements Planning (MRP) production plan using either the heuristic processing or the linear programming processing;
a module for calculating for the each manufacturing stage a best-can-do production plan using one of a heuristic processing or a linear programming processing depending on the partitioning; and
a module for preparing MRP production solution information to be passed recursively forward to a next manufacturing stage of the separate manufacturing stages based on the best-can-do calculating step.

24. A machine readable medium containing code for computing a production plan for part numbers (PNs) throughout a bill of material supply chain, comprising the steps of:
separating bill of materials (BOM) into separate manufacturing stages substantially independent of one another;
partitioning each manufacturing stage of the separate manufacturing stages into a heuristic processing and a linear programming processing partition;
assigning PNs to the partitioned manufacturing stages;
calculating for the each manufacturing stage a Material Requirements Planning (MRP) production plan using either the heuristic processing or the linear programming processing;
calculating for the each manufacturing stage a best-can-do production plan using one of a heuristic processing or a linear programming processing depending on the partitioning step; and
preparing MRP production solution information to be passed recursively forward to a next manufacturing stage of the separate manufacturing stages based on the best-can-do calculating step.

\* \* \* \* \*